(12) United States Patent
Maeda et al.

(10) Patent No.: US 9,113,015 B2
(45) Date of Patent: Aug. 18, 2015

(54) DISPLAY DEVICE, AND IMAGE FORMING APPARATUS AND ELECTRONIC DEVICE LOADED THEREWITH

(75) Inventors: Tetsuya Maeda, Osaka (JP); Yasuhiro Sekiguchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 341 days.

(21) Appl. No.: 12/882,297

(22) Filed: Sep. 15, 2010

(65) Prior Publication Data

US 2011/0078631 A1 Mar. 31, 2011

(30) Foreign Application Priority Data

Sep. 30, 2009 (JP) ................................. 2009-226442
Sep. 30, 2009 (JP) ................................. 2009-226451

(51) Int. Cl.
*G06F 17/00* (2006.01)
*H04N 1/00* (2006.01)
*H04N 1/32* (2006.01)

(52) U.S. Cl.
CPC ......... *H04N 1/00416* (2013.01); *H04N 1/0048* (2013.01); *H04N 1/00352* (2013.01); *H04N 1/00387* (2013.01); *H04N 1/00411* (2013.01); *H04N 1/00424* (2013.01); *H04N 1/00427* (2013.01); *H04N 1/00474* (2013.01); *H04N 1/00498* (2013.01); *H04N 1/32096* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,627,980 | A * | 5/1997 | Schilit et al. ................... | 715/841 |
| 6,018,342 | A * | 1/2000 | Bristor ........................... | 715/840 |
| 6,734,881 | B1 * | 5/2004 | Will ............................... | 715/811 |
| 8,429,561 | B2 * | 4/2013 | Harada .......................... | 715/816 |
| 2001/0000668 | A1 * | 5/2001 | Bodnar .......................... | 345/339 |
| 2002/0113825 | A1 * | 8/2002 | Perlman et al. ................ | 345/812 |
| 2003/0222923 | A1 * | 12/2003 | Li .................................. | 345/815 |
| 2005/0246331 | A1 * | 11/2005 | DeVorchik et al. ............. | 707/3 |
| 2006/0020900 | A1 * | 1/2006 | Kumagai et al. .............. | 715/767 |
| 2008/0074399 | A1 * | 3/2008 | Lee ................................ | 345/173 |
| 2008/0140718 | A1 * | 6/2008 | Evans et al. ................. | 707/104.1 |
| 2008/0199052 | A1 | 8/2008 | Okamoto et al. | |
| 2008/0250352 | A1 * | 10/2008 | Zaliva ........................... | 715/816 |
| 2009/0204584 | A1 | 8/2009 | Harada | |

FOREIGN PATENT DOCUMENTS

| | | |
|---|---|---|
| CN | 101087327 A | 12/2007 |
| JP | 2001-184153 | 7/2001 |
| JP | 2002-222053 | 8/2002 |
| JP | 2006-191660 | 7/2006 |

(Continued)

*Primary Examiner* — Keith Bloomquist
(74) *Attorney, Agent, or Firm* — Smith, Gambrell & Russell LLP.

(57) ABSTRACT

A display device includes: an operation display part having a touch panel part displaying on a screen a plurality of input keys and accepting key operation, the operation display part displaying a list with an array of a plurality of items; a key operation detection part detecting operation on the input key; and a control part specifying the operated input key based on information from the key operation detection part, and displaying, at the operation display part in two rows or two columns, an array of: a plurality of first input keys arrayed for narrowing down the items to be displayed on the list; and a plurality of second input keys displayed as a result of operation of the first input key and arrayed for further narrowing down the items to be displayed on the list.

6 Claims, 21 Drawing Sheets

(56) References Cited

FOREIGN PATENT DOCUMENTS

| | | |
|---|---|---|
| JP | 2007-148541 | 6/2007 |
| JP | 2008-72515 | 3/2008 |
| JP | 2008-124751 | 5/2008 |
| JP | 2009-187637 A | 8/2009 |

* cited by examiner

# DISPLAY DEVICE, AND IMAGE FORMING APPARATUS AND ELECTRONIC DEVICE LOADED THEREWITH This application is based on Japanese Patent Applications No. 2009-226451 filed on Sep. 30, 2009 and No. 2009-226442 filed on Sep. 30, 2009, the contents of which are hereby incorporated by reference.

BACKGROUND OF THE INVENTION

1. Field of the Invention

The present invention relates to a display device having a touch panel function and displaying as a list items specified by operation of this function. The present invention also relates to an image forming apparatus and an electronic device loaded with this display device.

2. Description of Related Art

A recently wide-spread image forming apparatus is of a type, so-called a multifunction printer, having functions as a copier, a printer, a facsimile, and a scanner in combination. Such an image forming apparatus is provided with not only an image formation function but also a communication function of transmitting image data to a distant place via a telephone line or a network line.

The image data communication function is provided with a so-called address book for destination management. The address book is a list of a plurality of destinations arrayed as items. The communication function, based on destination information of a destination specified through search on the address book by the user, sets an address and transmits the image data. Typically, in the image forming apparatus, a display device having the touch panel function is provided on a front surface of the image forming apparatus, and the address book is displayed on this display device.

JP-A-No2008-124751 shows one example of a display device that displays an address book. The display device (touch screen) of a scanner described in this patent document is provided with a destination specification screen, on which an address list display region, up and down buttons of this list, etc. are arranged. On the address list display region, five pieces of address information can be displayed, and displaying other addresses requires moving the list vertically with the up and down buttons. The same operation is required for other electronic devices, such as a cellular phone unit and a PDA, that are provided with an address book.

Since the display device of the scanner described in the patent document above uses the up and down buttons to change the display of the address list, address search is very difficult. In recent years, memory capacity has increased due to technical development, and thus it is not rare to see an apparatus capable of storing, for example, more than 1000 pieces of destination information. Therefore, the display device of the scanner described in the patent document above has poor operability related to the address search, and the search may be further prolonged, resulting in a risk that a sense of discomfort is given to the user.

To improve efficiency in the address search, it is possible to provide input keys that limit addresses to be displayed on the screen. The introduction of the input keys that limit the addresses to be displayed permits shortening of time required for displaying a desired address, resulting in improvement in the operability of the display device related to the address search. However, for the user to perform the address search without taking unnecessary procedures as a result of, for example, a key operation error made by the user, not only simply arraying on the screen the input keys that limit the addresses to be displayed but also elaborating a shape, a size, indication, etc. of the input keys is effective. As a result, the operability of the display device related to the address search further improves.

SUMMARY OF THE INVENTION

In view of the problem described above, the present invention has been made, and it is an object of the invention to provide a display device which can narrow down items and then easily display a desired item on a list without taking unnecessary procedures and which has improved operability related to item search. It is also an object of the invention to provide an image forming apparatus and an electronic device loaded with such a display device and provided with excellent user-friendliness.

To solve the problem described above, a display device according to one aspect of the invention includes: an operation display part having a touch panel part displaying on a screen a plurality of input keys and accepting key operation, the operation display part displaying a list with an array of a plurality of items; a key operation detection part detecting operation on the input key; and a control part specifying the operated input key based on information from the key operation detection part, and displaying, at the operation display part in two rows or two columns, an array of: a plurality of first input keys arrayed for narrowing down the items to be displayed on the list; and a plurality of second input keys displayed as a result of operation of the first input key and arrayed for further narrowing down the items to be displayed on the list.

With this configuration, simultaneously displayed on the display device are: the list with the array of the plurality of items; and the plurality of first input keys and the plurality of second input keys for narrowing down the items to be displayed on the list.

In the display device with the configuration described above, the control part may display, at the operation display part at a section close to the list, the plurality of first input keys or the plurality of second input keys, whichever was operated last time.

With this configuration, the input key operated by the user last time and the items narrowed down with this operation and then displayed on the list approach each other.

In the display device with the configuration described above, the control part may display at the operation display part the plurality of first input keys and the plurality of second input keys below the list vertically in two rows, and may also display on an upper side the plurality of first input keys or the plurality of second input keys, whichever was operated last time.

In the display device with the configuration described above, the control part may display the plurality of first input keys and the plurality of second input keys at the operation display part below the list vertically in two rows, and may also display the plurality of second input keys on an upper side by operation of the plurality of first input keys.

In the display device with the configuration described above, the control part may display the plurality of first input keys or the plurality of second input keys, whichever was operated last time, larger than the other.

With this configuration, the input key operated by the user last time can more easily be identified than the other keys.

In the display device with the configuration described above, the plurality of first input keys and the plurality of second input keys may have mutually different shapes and/or colors.

With this configuration, a difference between the input keys can easily be identified.

To solve the problem described above, a display device according to another aspect of the invention includes: an operation display part having a touch panel part displaying on a screen a plurality of input keys and accepting key operation, the operation display part displaying a list with an array of a plurality of items; a key operation detection part detecting operation on the input key; and a control part specifying the operated input key based on information from the key operation detection part, displaying at the operation display part a plurality of narrow-down keys arrayed for narrowing down the items to be displayed on the list, and varying display modes of the plurality of narrow-down keys based on numbers of items corresponding to the narrow-down keys.

With this configuration, the list with the array of the plurality of items and the plurality of narrow-down keys arrayed for narrowing down the items to be displayed on the list are displayed on the screen, and the plurality of narrow-down keys are displayed in different display modes due to a difference in the number of corresponding items.

In the display device with the configuration described above, the control part, when there is none of the items corresponding to the narrow-down key, may gray-out display the narrow-down key at the operation display part.

In the display device with the configuration described above, the control part, upon detection of operation on the narrow-down key gray-out displayed, may display at the operation display part a report that there is none of the items corresponding to the narrow-down key.

In the display device with the configuration described above, the control part, when there is none of the items corresponding to the narrow-down key, may not display the narrow-down key at the operation display part.

With this configuration, the user recognizes at first view that there is none of the items corresponding to the narrow-down key not displayed.

In the display device with the configuration described above, the control part, based on the numbers of items corresponding to the narrow-down keys, may display the plurality of narrow-down keys at the operation display part in different sizes.

With this configuration, for example, the narrow-down key with a large number of corresponding items is displayed on a relatively large scale while the narrow-down key with a small number of corresponding items is displayed on a relatively small scale.

In the display device with the configuration described above, the control part, based on the number of items corresponding to the narrow-down key, may divide the narrow-down key into a plurality of keys and display the plurality of keys at the operation display part.

With this configuration, the number of corresponding items per narrow-down key decreases, which makes the search easy.

In the display device with the configuration described above, the control part may display the numbers of items corresponding to the narrow-down keys respectively on the plurality of narrow-down keys.

With this configuration, the numbers of items corresponding to the narrow-down keys are clarified.

In the invention, the display device with the configuration described above is loaded in an image forming apparatus and an electronic device.

DETAILED DESCRIPTION OF PREFERRED EMBODIMENTS

Embodiments of the present invention will be described with reference to FIGS. 1 to 21.

Figure 1:
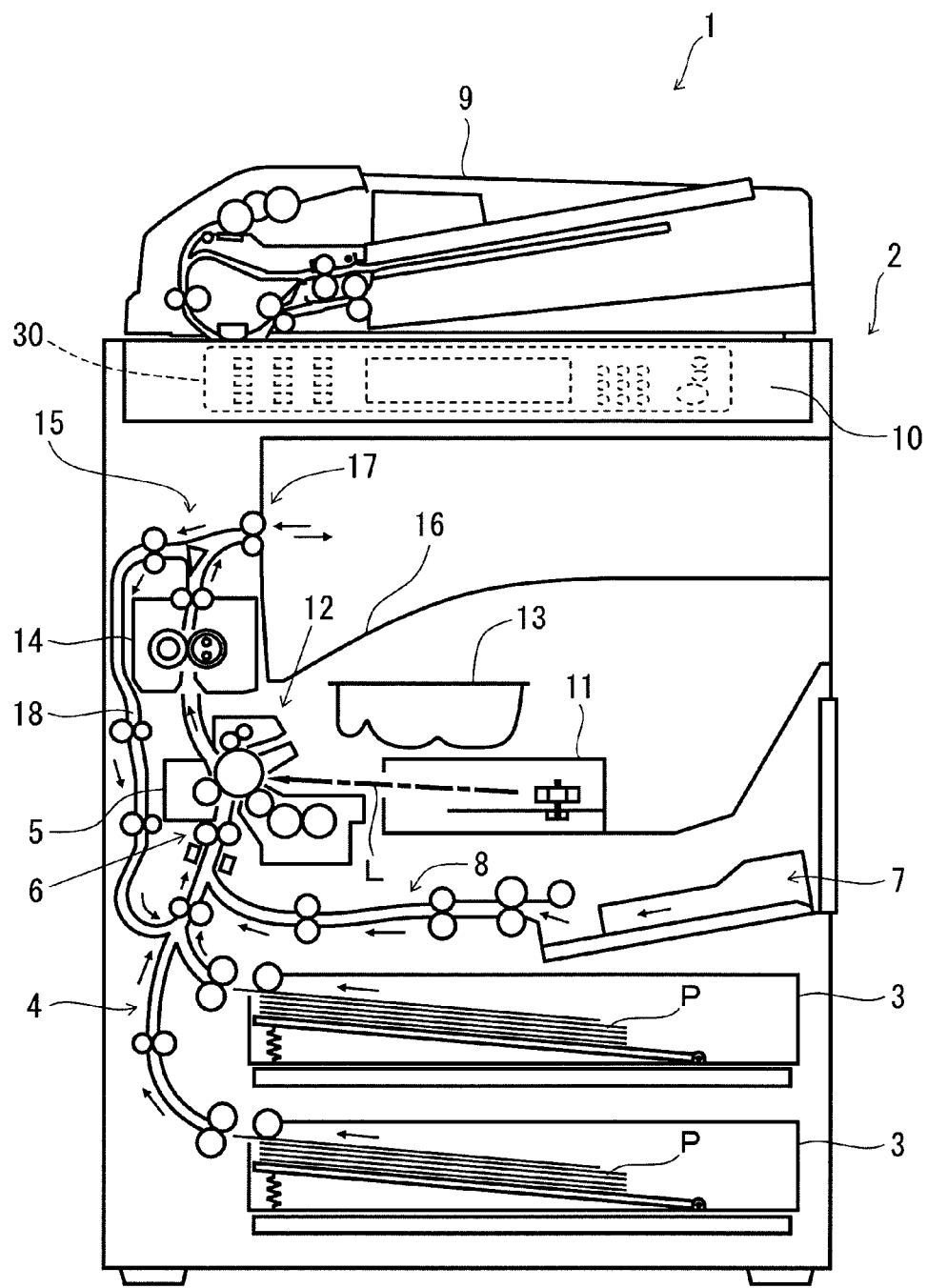
FIG. 1 is a schematic vertically sectioned elevational view of an image forming apparatus loaded with a display device according to a first embodiment of the present invention.
Figure 2:
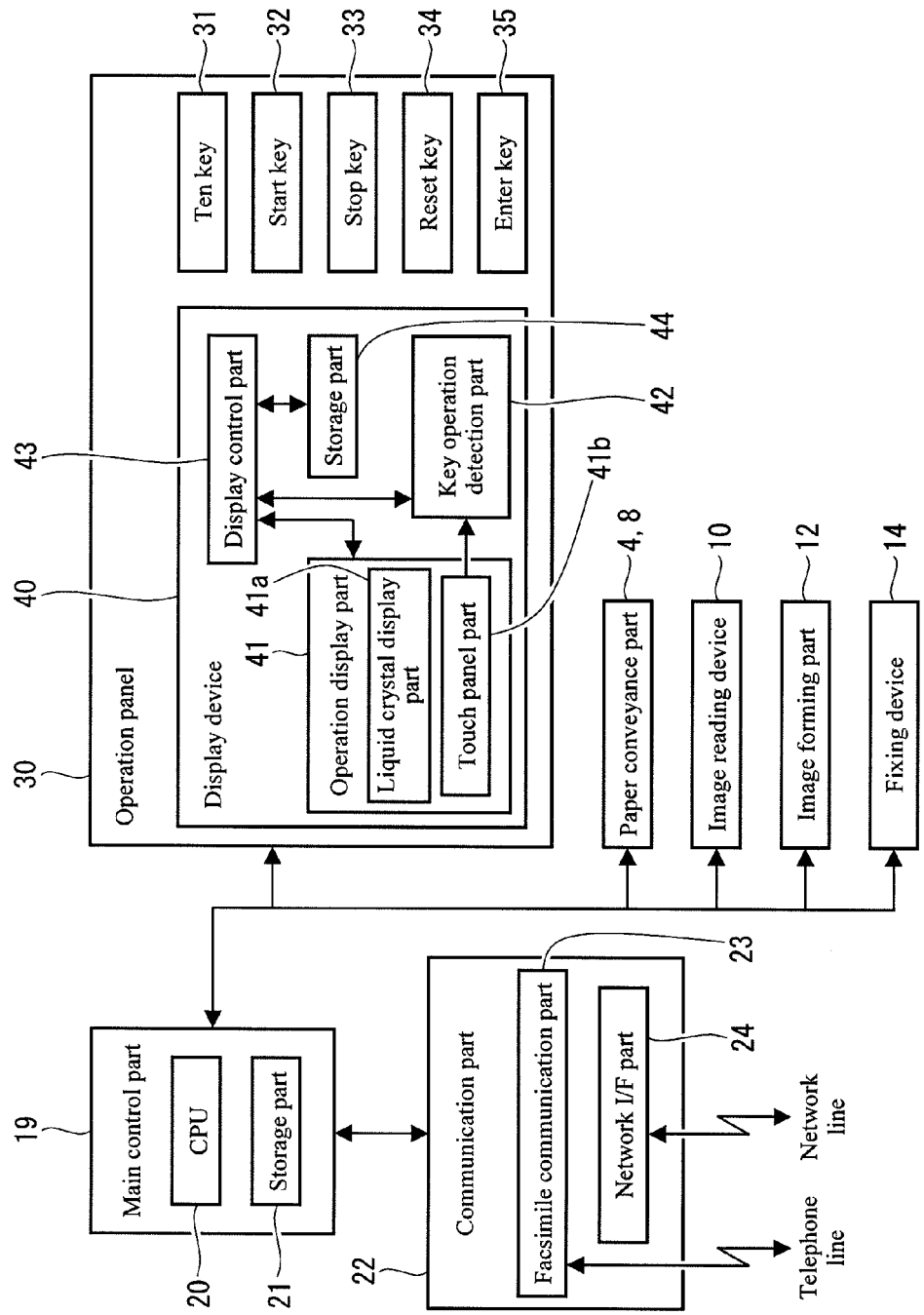
FIG. 2 is a block diagram showing configuration of the image forming apparatus of FIG. 1.

First, outlines of structure of an image forming apparatus loaded with a display device according to the first embodiment of the invention and also image output operation will be described with reference to FIGS. 1 and 2. FIG. 1 is a schematic vertically sectioned elevational view of the image forming apparatus, and FIG. 2 is a block diagram showing configuration of the image forming apparatus. In FIG. 1, arrows of a solid line indicate a paper conveyance path and a conveyance direction and an arrow of a dashed line indicates laser light L.

As shown in FIG. 1, at the inner bottom of a main body 2 of the image forming apparatus 1, paper cassettes 3 are arranged. The paper cassette 3 stores paper P, such as unprinted cut paper, stacked therein. This paper P is delivered upward to the left of the paper cassette 3 individually and separately. The paper cassette 3 can also be drawn out horizontally from a front side of the main body 2.

Inside of the main body 2 and to the left of the paper cassettes 3, a first paper conveyance part 4 is provided. The first paper conveyance part 4 is formed substantially vertically along a left side surface of the main body 2. The first paper conveyance part 4 receives the paper P delivered from the paper cassette 3, and conveys it vertically upward to a transfer part 5 along the left side surface of the main body 2.

On the paper conveyance path immediately upstream of the transfer part 5, a registration roller pair 6 is provided. The registration roller pair 6 corrects skew of the paper P directed toward the transfer part 5 and then delivers it at appropriate timing so that a toner image can properly be transferred onto the paper P.

Above the paper cassettes 3 and at a section of a right side surface of the main body 2 opposite to the left side surface thereof where the first paper conveyance part 4 is formed, a manual paper feed part 7 is provided. Stacked in the manual paper feed part 7 are: paper of a size not included in the paper cassettes 3; those (for example, a cardboard and an OHP sheet) which are to be delivered manually and individually.

To the left of the manual paper feed part 7, a second paper conveyance part 8 is provided. The second paper conveyance part 8 extends immediately above the paper cassettes 3 and substantially horizontally from the manual paper feed part 7 to the first paper conveyance part 4 and then joins the first paper conveyance part 4. The second paper conveyance part 8 receives the paper delivered from the manual paper feed part 7, and conveys it to the first paper conveyance part 4 substantially horizontally.

On the other hand, provided on the top of the main body 2 of the image forming apparatus 1 is a document conveying device 9, below which an image reading device 10 is provided. When the user performs copying on a document, he/she loads on the document conveying device 9 documents where an image of, for example, a character, a graphic, or a pattern is drawn. At the document conveying device 9, the documents are delivered individually and separately, and image data thereof is read by the image reading device 10.

Reading of the document image, that is, start of image formation is executed with an operation panel 30 provided at an upper part of the main body 2 and on a front side of the image reading device 10. The operation panel 30 accepts: for example, user's print condition settings including a type and size of paper to be used for printing, scaling, whether or not to perform duplex printing, etc.; destination settings in a facsimile. Detailed configuration of the operation panel 30 will be described below.

Information of the image data of the document is sent to an exposure device 11 arranged above the second paper conveyance part 8 and also at a central part of the main body 2. By the exposure device 11, the laser light L controlled based on the image data is irradiated toward an image forming part 12.

Above the first paper conveyance part 4 and also to the left of the exposure device 11, the image forming part 12 and the transfer part 5 are provided. In the image forming part 12, an electrostatic latent image of the document image is formed by the laser light L irradiated by the exposure device 11, and from this electrostatic latent image, a toner image is developed. A toner is resupplied to the image forming part 12 from a toner container 13 provided above the exposure device 11.

The toner image formed at the image forming part 12 is transferred, in the transfer part 5, onto the paper P delivered synchronously by the registration roller pair 6.

Above the transfer part 5, a fixing device 14 is provided. The paper P carrying the unfixed toner image at the transfer part 5 is delivered to the fixing device 14, where the toner image is heated and pressurized by a heat roller and a pressure roller for fixation.

Above the fixing device 14, a paper guide device 15 is provided. When no duplex printing is to be performed, the paper P discharged from the fixing device 14 is discharged from the paper guide device 15 to an in-body paper discharge part 16 provided in a body of the image forming apparatus 1.

A discharge port portion where the paper P is discharged from the paper guide device 15 toward the in-body paper discharge part 16 functions as a switch back part 17. When the duplex printing is to be performed, the conveyance direction of the paper P discharged from the fixing device 14 is switched at the switch back part 17. Then the paper P passes through the paper guide device 15, is delivered downwardly through a duplex printing paper conveyance path 18 provided to the left of the fixing device 14 and to the left of the transfer part 5, and is delivered again to the transfer part 5 via the first paper conveyance part 4.

Provided in the main body 2 for operation control of the entire image forming apparatus 1 is, as shown in FIG. 2, a main control part 19 composed of a CPU 20, a storage part 21, and other electronic components (not shown). The main control part 19, using the CPU 20 as a central processing unit, controls the components such as the image reading device 10, the image forming part 12, and the fixing device 14 based on a program and data stored and inputted into the storage part 21 to thereby achieve a series of image formation operation. The main control part 19 accepts through the operation panel 30 user's condition settings related to the operation of the image forming apparatus 1.

The image forming apparatus 1 is provided with a communication part 22 for performing transmission and reception of image data to and from an external device by use of a telephone line or a network line. The communication part 22 is provided with: a facsimile communication part 23 that makes communication by use of the phone line; and a network I/F (interface) part 24 that makes communication by use of the network line.

Figure 3:
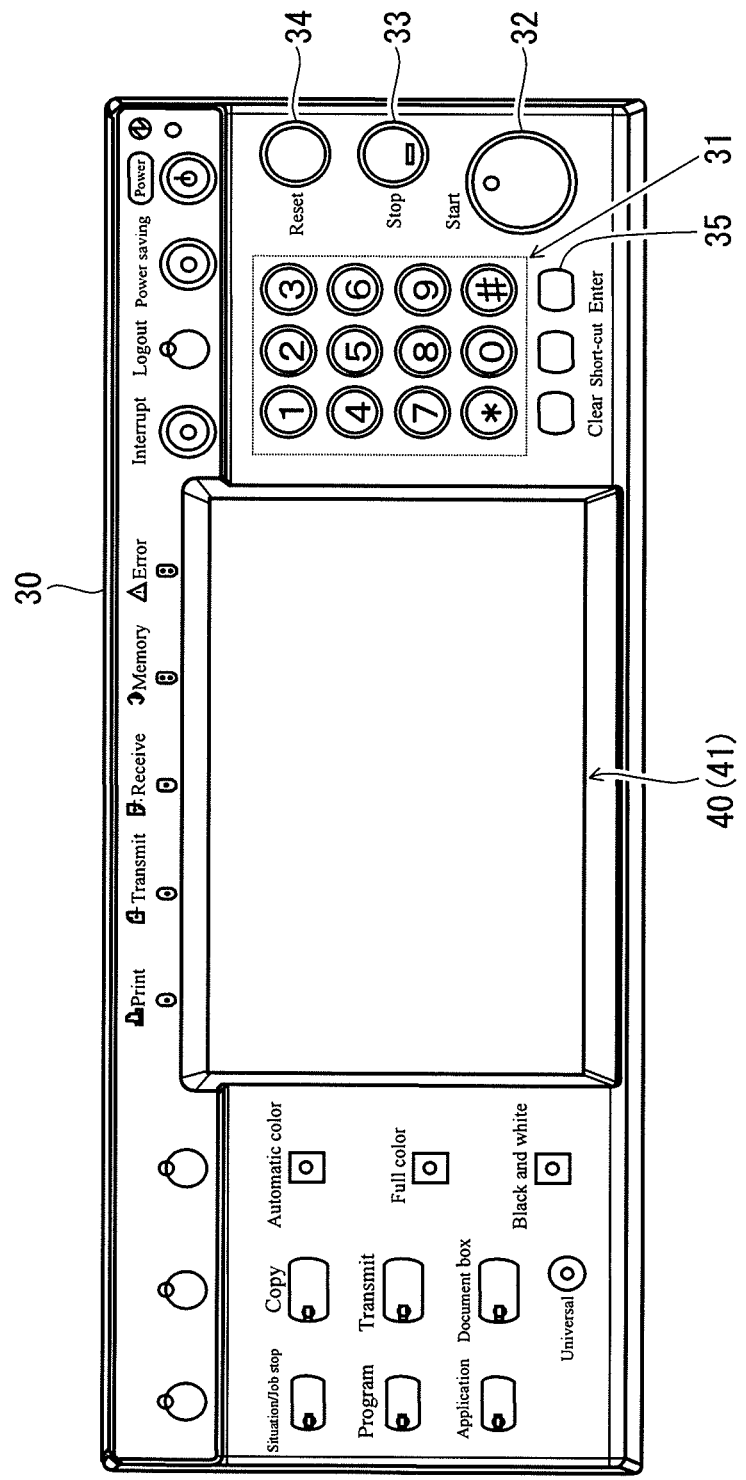
FIG. 3 is an elevational view of an operation panel of the image forming apparatus shown in FIG. 1.
Figure 4:
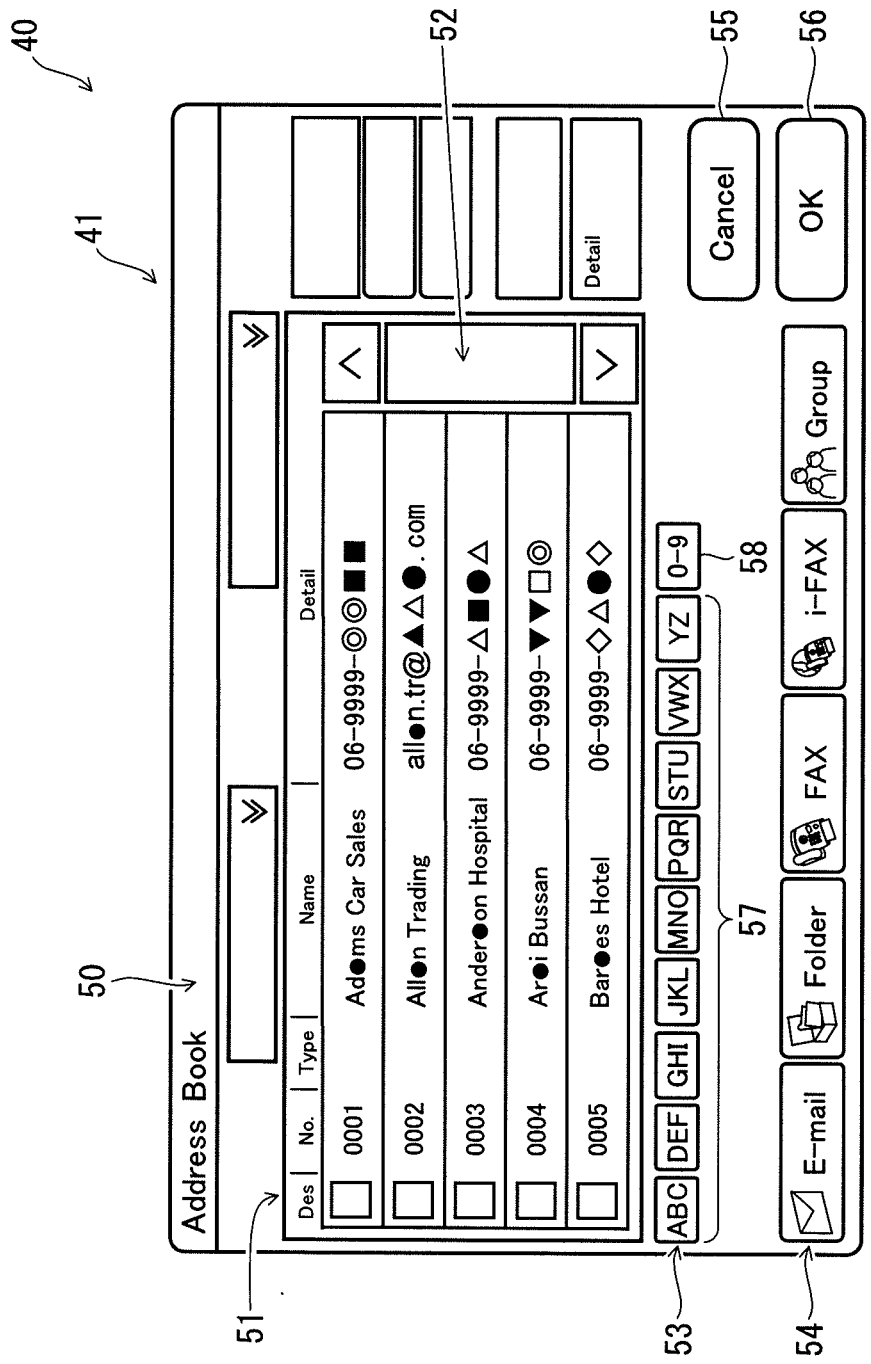
FIG. 4 is an elevational view of a display device of the operation panel shown in FIG. 3.
Figure 5:
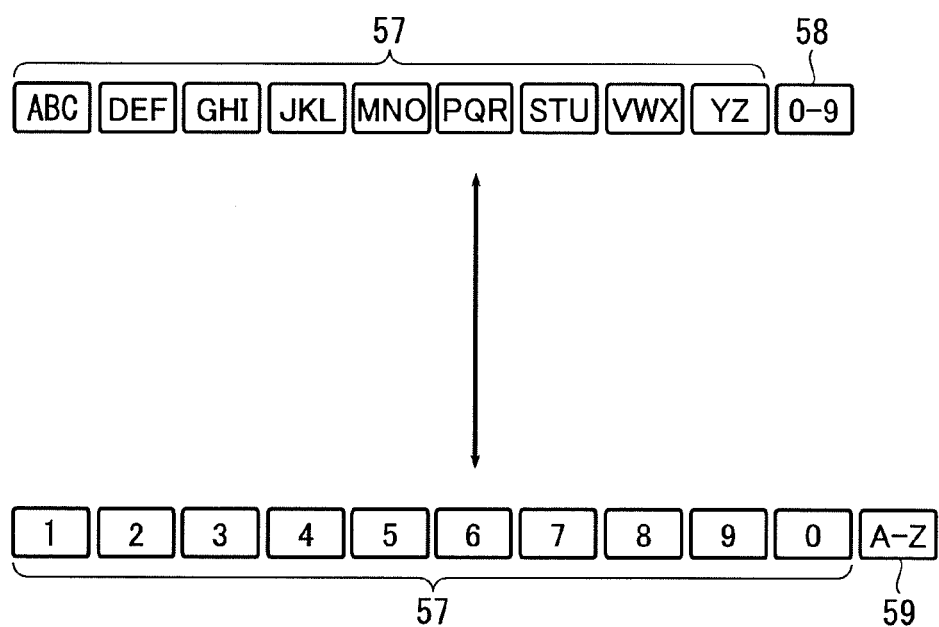
FIG. 5 is an explanatory diagram displaying a change in display of first input keys of the display device of FIG. 4.
Figure 6:
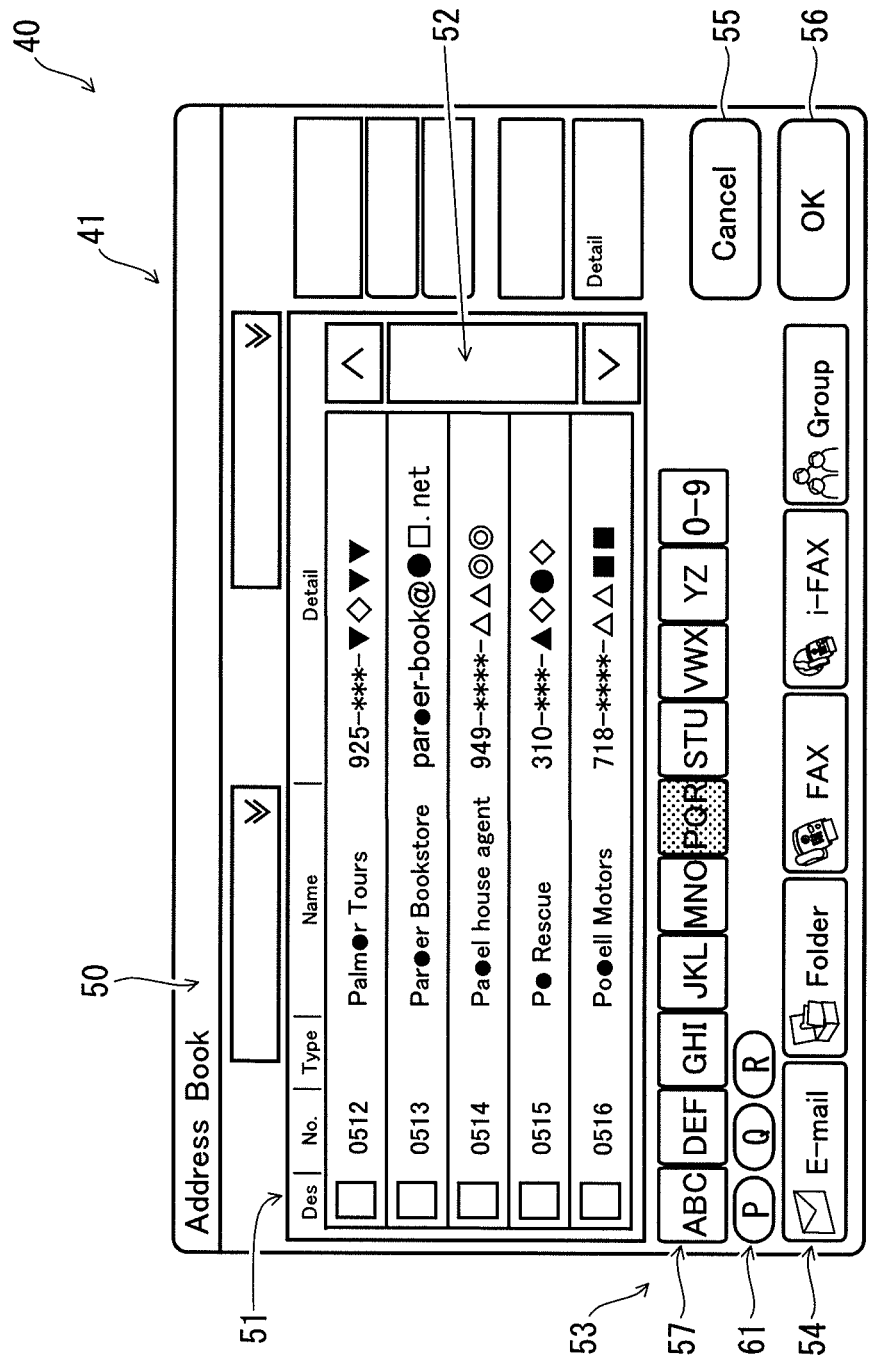
FIG. 6 is an elevational view of the same display device as that of FIG. 4, showing a state in which a plurality of first input keys and a plurality of second input keys are arranged.

Next, the detailed configuration of the operation panel 30 will be described with reference to FIGS. 3 to 6 in addition to FIG. 2. FIG. 3 is an elevational view of the operation panel 30 of the image forming apparatus 1, FIG. 4 is an elevational view of a display device of the operation panel 30, FIG. 5 is an elevational view displaying a change in display of first input keys of the display device, and FIG. 6 is an elevational view of the same display device as that of FIG. 4, showing a state in which a plurality of first input keys and a plurality of second input keys are arranged.

As shown in FIGS. 2 and 3, the operation panel 30 is provided with a ten key 31, a start key 32, a stop key 33, a reset key 34, an enter key 35, and the display device 40.

The ten key 31, the start key 32, the stop key 33, the reset key 34, and the enter key 35 are arranged in a region on the right side of the operation panel 30 as shown in FIG. 3. The ten key 31 accepts numerical input. The start key 32 accepts instructions for starting various types of operation. The stop key 33 accepts instructions for stopping the various types of operation. The reset key 34 accepts instructions for resetting various settings. The enter key 35 works in the same manner as so-called "OK" instructions for permitting the various settings.

The display device 40 is arranged at a central part of the operation panel 30. As shown in FIG. 2, the display device 40 is provided with: an operation display part 41, a key operation detection part 42, a display control part 43, and a storage part 44.

The operation display part 41 is provided with a liquid crystal display part 41a and a touch panel part 41b. The liquid crystal display part 41a displays items such as input, settings, and instructions by use of liquid crystals. The touch panel part 41b is so arranged as to be superposed on the liquid crystal part 41a, and accepts key input or selection of the item displayed at the liquid crystal display part 41a through user's contact with his/her finger or the like.

The key operation detection part 42 detects the user's contact with his/her finger or the like on the touch panel part 41b. The key operation detection part 42 transmits to the display control part 43 information obtained from the touch panel part 41b, that is, information on the key input on the touch panel part 41b by the user.

The display control part 43 is a controller which is formed of an electronic component such as an IC and which controls the display device 40 based on the control by the main control part 19. The display control part 43, in response to control directions from the main control part 19, performs display control of the operation display part 41 of the display device 40 by setting a type and layout of the input key and the item to be displayed based on a program and data stored in the storage part 21 or the storage part 44. Moreover, the display control part 43 specifies the input key operated by the user based on the information from the key operation detection part 42, and transmits it as user operation instructions to the main control part 19.

Here, the display device 40 can display at the operation display part 41 an address book screen 50 shown in FIG. 4 and useable in cooperation with the communication part 22. The address book screen 50 displays as a list an array of a plurality of pieces of destination information as its items. Layout-related information and the destination information in the address book are stored in the storage part 21 or the storage part 44. The image forming apparatus 1 transmits the image data to the destination that the user has selected and set from among a plurality of destinations displayed on the address book screen 50.

Arranged on the address book screen 50 are: a destination list display part 51, scroll keys 52, narrow-down keys 53, transmission method selection keys 54, a cancel key 55, and an OK key 56.

The destination list display part 51 is provided in a relatively wide region at a substantially central part of the address book screen 50. The destination list display part 51 vertically arrays the plurality of pieces of destination information previously registered as items and displays them as the list. Registered as the destination information are detailed communication-related information including a registration number, a name (designation), a phone number, and a mail address. A display region of the destination list display part 51 includes, for example, 5 pieces of destination information.

The scroll keys 52 are arranged to the right of the destination list display part 51, and the narrow-down keys 53 are arranged below the destination list display part 51. The scroll keys 52 and the narrow-down keys 53 are both used for displaying at the destination list display part 51 desired destination information not displayed at the display region of the destination list display part 51. The scroll keys 52 vertically scroll the list of destinations at the destination list display part 51.

The narrow-down keys 53 are provided with input key groups including a plurality of first input keys 57 and a numerical key 58. On the first input keys 57, 26 alphabetical letters are respectively set and indicated in sets of approximately three letters each. Specifically, they start with "ABC", "DEF", ending with the two letters "YZ" only at the end. The first input keys 57 are arrayed for narrowing down the destination information to be displayed on the destination list.

Here, this embodiment will be described below, referring to as one example a case where "three or two alphabetical letters" are set on each of the plurality of first input keys 57. As shown in FIG. 5, pressing the numerical key 58 makes it possible to set "numerals from 0 to 9" on the first input keys 57. Note that pressing an alphabet key 59 in this state makes it possible to set "three or two alphabetical letters" on each of the first input keys 57 again.

Pressing any of the first input keys 57, shown in FIG. 4, on which "three or two alphabetical letters" have been set results in display of a plurality of second input keys 61 as another narrow-down keys 53 below the first input keys 57, as shown in FIG. 6. On the second input keys 61, "single alphabetical letters" corresponding to the pressed first input key 57 are respectively set and indicated. For example, as shown in FIG. 6, when "PQR" of the plurality of first input keys 57 has been pressed, "P", "Q", and "R" are displayed as the plurality of second input keys 61 immediately below the plurality of first input keys 57. The second input keys 61 are arrayed for further narrowing down the destination information narrowed down and displayed on the destination list as a result of pressing the first input key 57. Configuration, display methods, etc. of the first input keys 57 and the second input keys 61 will be described in detail below.

The transmission method selection keys 54 are arranged at a lowest part of the address book screen 50. The image forming apparatus 1 includes a plurality of transmission methods such as "E-mail", "Facsimile (FAX)", and "Internet Facsimile (i-FAX)", and these plurality of transmission methods are set as the transmission method selection keys 54 on the respective input keys. The user uses the transmission method selection key 54 to select a desired image data transmission method.

Operating the transmission method selection key 54 before selecting and setting the destination makes it possible to, based on presence/absence of the transmission information corresponding to the transmission method, previously narrow down the destination information to be displayed on the destination list without operating the first input key 57 and the second input key 61.

The cancel key 55 and the OK key 56 are both arranged at a lowest right end of the address book screen 50. The cancel key 55 is used at time of cancelling the selected input, and the OK key 56 is used at time of permitting the input.

Figure 7:
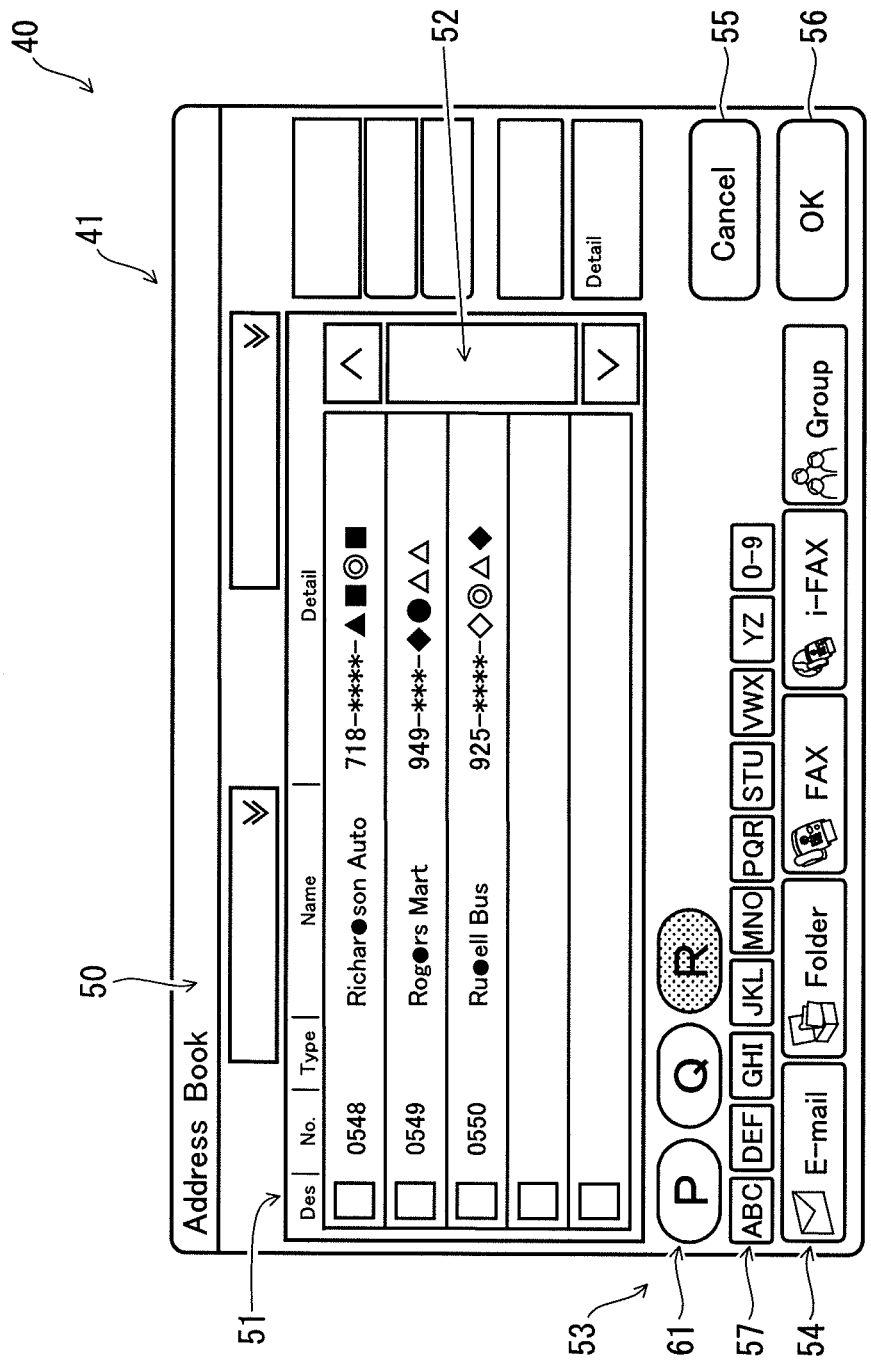
FIG. 7 is an elevational view of the same display device as that of FIG. 6, showing a state in which the plurality of second input keys is arranged on an upper side.
Figure 8:
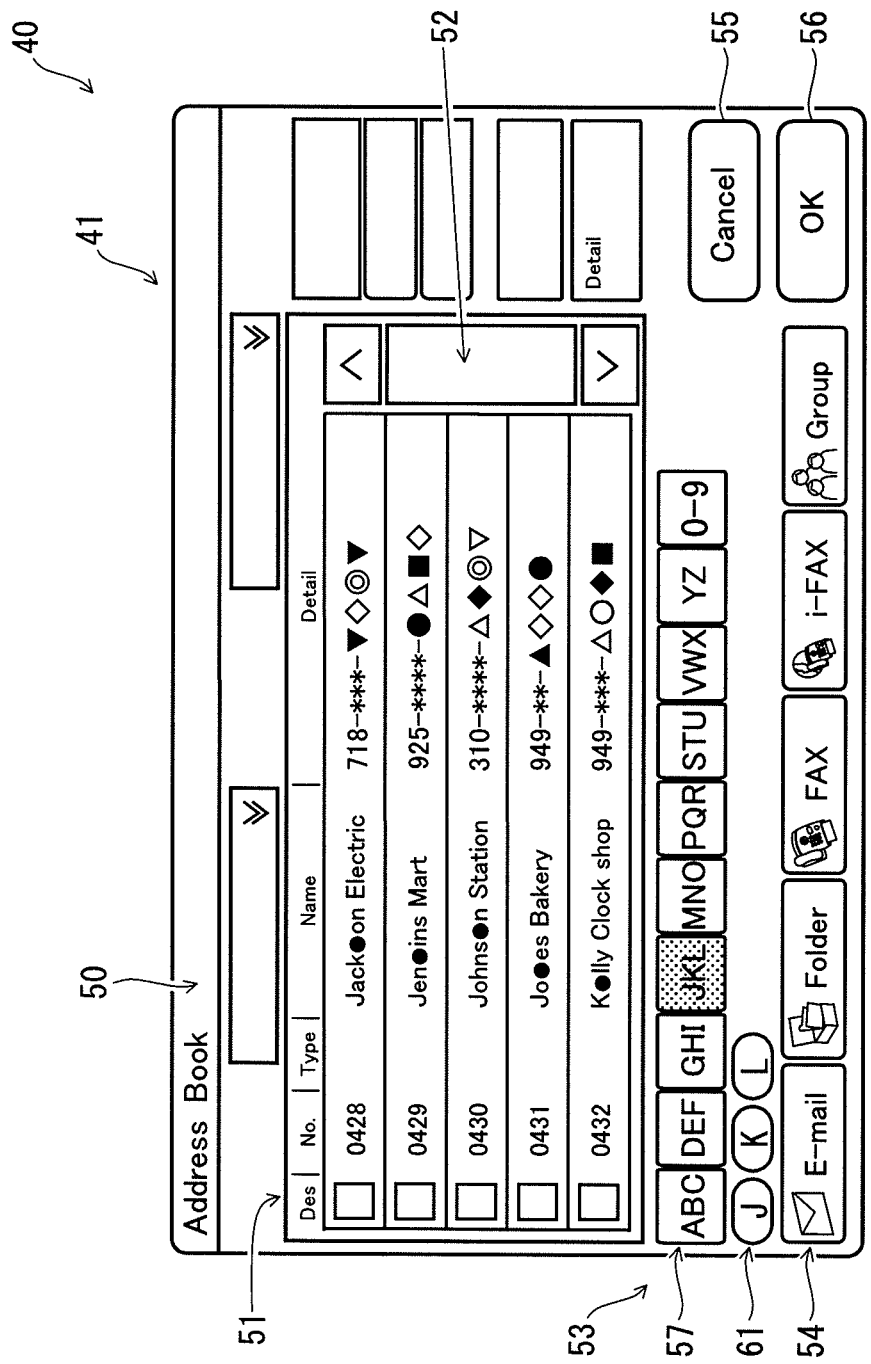
FIG. 8 is an elevational view of the same display device as that of FIG. 6, showing a state in which the first input key different from that of FIG. 6 has been selected.

Next, an operation method related to destination search on the address book screen 50 of the display device 40 will be described, with reference to FIGS. 7 to 9 in addition to FIGS. 2, 4, and 6 and along a flow shown in FIG. 9. FIG. 7 is an elevational view of the same display device 40 as that of FIG. 6, showing a state in which the plurality of second input keys 61 are arranged on an upper side, FIG. 8 is an elevational view of the same display device 40 as that of FIG. 6, showing a state in which the first input key 57 different from that of FIG. 6 has been selected, and FIG. 9 is a flow chart showing operation related to the destination search in the display device 40.

The description below with reference to these figures is based on the assumption that an initial state is not a state in which the destination information to be displayed on the destination list has been previously narrowed down by operating the transmission method selection key 54. Moreover, the description below refers to the operation from when the first input key 57 and the second input key 61 are operated to narrow down the destination information to when a desired destination displayed at the destination list display part 51 is selected and set.

Figure 9:
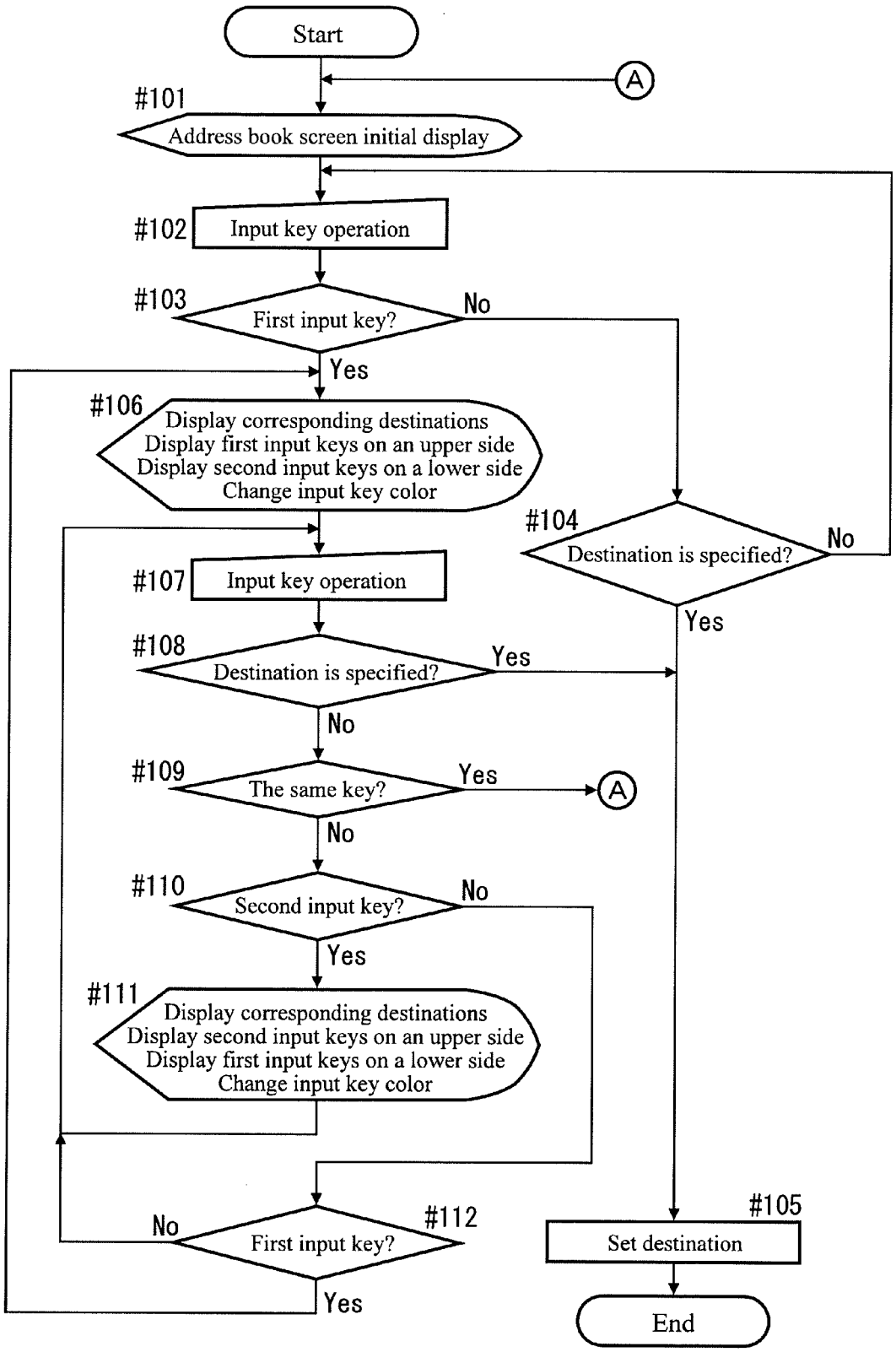
FIG. 9 is a flow chart showing operation related to destination search in the display device according to the first embodiment.

When selection of the destination of the image data is needed in the image forming apparatus 1 (Start in FIG. 9), the initial state of the address book screen 50 shown in FIG. 4 is displayed at the operation display part 41 of the display device 40 (step #101 in FIG. 9). At this point, at the destination list display part 51 of the address book screen 50, the pieces of destination information registered in the address book are displayed in an alphabetical order from the top. Since the display region of the destination list display part 51 includes five pieces of destination information, only the top five pieces are displayed.

Subsequently, upon input key operation by the user (step #102), the display control part 43, based on the information from the key operation detection part 42, determines whether or not the input key operated by the user is the first input key 57 (step #103).

If the input key is not the first input key 57 (No in step #103), the display control part 43 determines whether or not the input key has specified the destination, that is, has selected any of the destinations displayed at the destination list display part 51 (step #104). If the input key has specified the destination in step #104 (Yes in step #104), the display control part 43 sets this destination (step #105), and the flow related to the destination selection ends (End in FIG. 9). If the input key has not specified the destination (No in step #104), the display control part 43 turns again into a state of standby for input key operation (step #102).

On the other hand, if the input key is the first input key 57, for example, the "PQR" in FIG. 4 in step #103 (Yes in step #103), the display control part 43 changes the address book screen 50 shown in FIG. 4 to that as shown in FIG. 6. Specifically, the display control part 43 displays at the destination list display part 51 the pieces of destination information corresponding to the "PQR" of the pressed first input key 57 in order from the top (step #106).

Then the display control part 43 displays the operated first input key 57 group immediately below the destination list display part 51 and the second input key 61 group corresponding to the "PQR" further therebelow (the same step #106). On the second input keys 61, "single alphabetical letters" corresponding to the "PQR" of the pressed first input key 57 are respectively set and indicated. Specifically, as the plurality of second input keys 61, "P", "Q", and "R" are each displayed immediately below the plurality of first input keys 57.

Since the display control part 43 displays the plurality of first input keys 57 and the plurality of second input keys 61 arrayed vertically in two rows as described above, these input keys are simultaneously displayed, which permits the user to easily narrow down the destination information. Moreover, since the display control part 43 displays, at a section close to the destination list display part 51, the plurality of first input keys 57 or the plurality of second input keys 61, whichever were operated last time, the user can easily identify the input key currently selected by himself/herself, resulting in improved operability related to the destination selection.

Moreover, the display control part 43 displays each key of the first input key 57 group larger than each key of the second input key 61 group, and also displays the "PQR" of the operated first input key 57 in a color different from colors of the other keys. This makes it even easier for the user to identify the input key currently selected by himself/herself, resulting in further improved operability related to the destination selection.

The plurality of first input keys 57 and the plurality of second input keys 61 have mutually different shapes; the plurality of first input keys 57 is formed into a substantially rectangular shape while the second input keys 61 is formed into an oval shape. Moreover, the plurality of first input keys 57 and the plurality of second input keys 61 may be displayed in mutually different colors, and further displaying the operated "PQR" key of the plurality of first input keys 57 in the color different from the colors of the other first input keys 57 makes the identification even easier.

Subsequently, upon input key operation by the user (step #107), the display control part 43 determines whether or not the input key has specified the destination (step #108). If the input key has specified the destination in step #108 (Yes in step #108), the display control part 43 sets this destination (step #105), and the flow related to the destination selection ends (End in FIG. 9).

If the input key has not specified the destination in step #108 (No in step #108), the display control part 43 determines whether or not this input key is the "PQR" of the first input key 57 that is the same as that operated last time (step #109). If the input key is the "PQR" of the first input key 57 in step #109 (Yes in step #109), the display control part 43 displays at the operation display part 41 the initial state of the address book screen 50 shown in FIG. 4 (step #101 in FIG. 9).

On the other hand, if the input key is not the "PQR" of the first input key 57 in step #109 (No in step #109), the display control part 43 determines whether or not this input key is the second input key 61 (step #110).

If the input key is the second input key 61, for example, "R" (Yes in step #110), the display control part 43 changes the address book screen 50 shown in FIG. 6 to that as shown in FIG. 7. Specifically, the display control part 43 displays at the destination list display part 51 the pieces of destination information corresponding to the "R" of the pressed second input key 61 in order from the top (step #111).

Then the display control part 43 displays the second input key 61 group "P", "Q", and "R" corresponding to the operated "PQR" immediately below the destination list display part 51 and the first input key 57 group further therebelow (the same step #111). Moreover, the display control part 43 displays each key of the second input key 61 group larger than each key of the first input key 57 group, and also displays the "R" of the operated second input key 61 in a color different from colors of the other keys. Then the display control part 43 turns again into a state of standby for input key operation (step #107).

If the input key is not the second input key 61 in step #110 (No in step #110), the display control part 43 determines whether or not this input key is the first input key 57 (step #112). If the input key is not the first input key 57 in step #112, the display control part 43 turns again into the state of standby for input key operation (step #107).

If the input key is the first input key 57, for example, "JKL" in step #112 (Yes in step #112), the display control part 43 changes the address book screen 50 shown in FIG. 7 to that as shown in FIG. 8. Specifically, the display control part 43 displays at the destination list display part 51 the pieces of destination information corresponding to the "JKL" of the pressed first input key 57 in order from the top (step #106).

Then the display control part 43 displays the operated first input key 57 group immediately below the destination list display part 51 and the second input key 61 group corresponding to the "JKL" further therebelow (the same step #106). Moreover, the display control part 43 displays each key of the first input key 57 group larger than each key of the second input key 61 group, and also displays the "JKL" of the operated first input key 57 in a color different from colors of the other keys. Then the display control part 43 turns again into a state of standby for input key operation (step #107).

With the configuration according to the first embodiment of the invention, simultaneously displayed on the display device 40 are: the destination list where the plurality of pieces of destination information are arrayed; and the plurality of first input keys 57 and the plurality of second input keys 61 for narrowing down the destinations to be displayed on the destination list. This makes it possible to narrow down the destinations by operating these input keys and easily display a desired destination on the destination list. Therefore, the display device 40 with improved operability related to the destination search can be provided. Moreover, the image forming apparatus 1 can be provided which is loaded with such a display device 40 and which has excellent user-friendliness.

Figure 10:
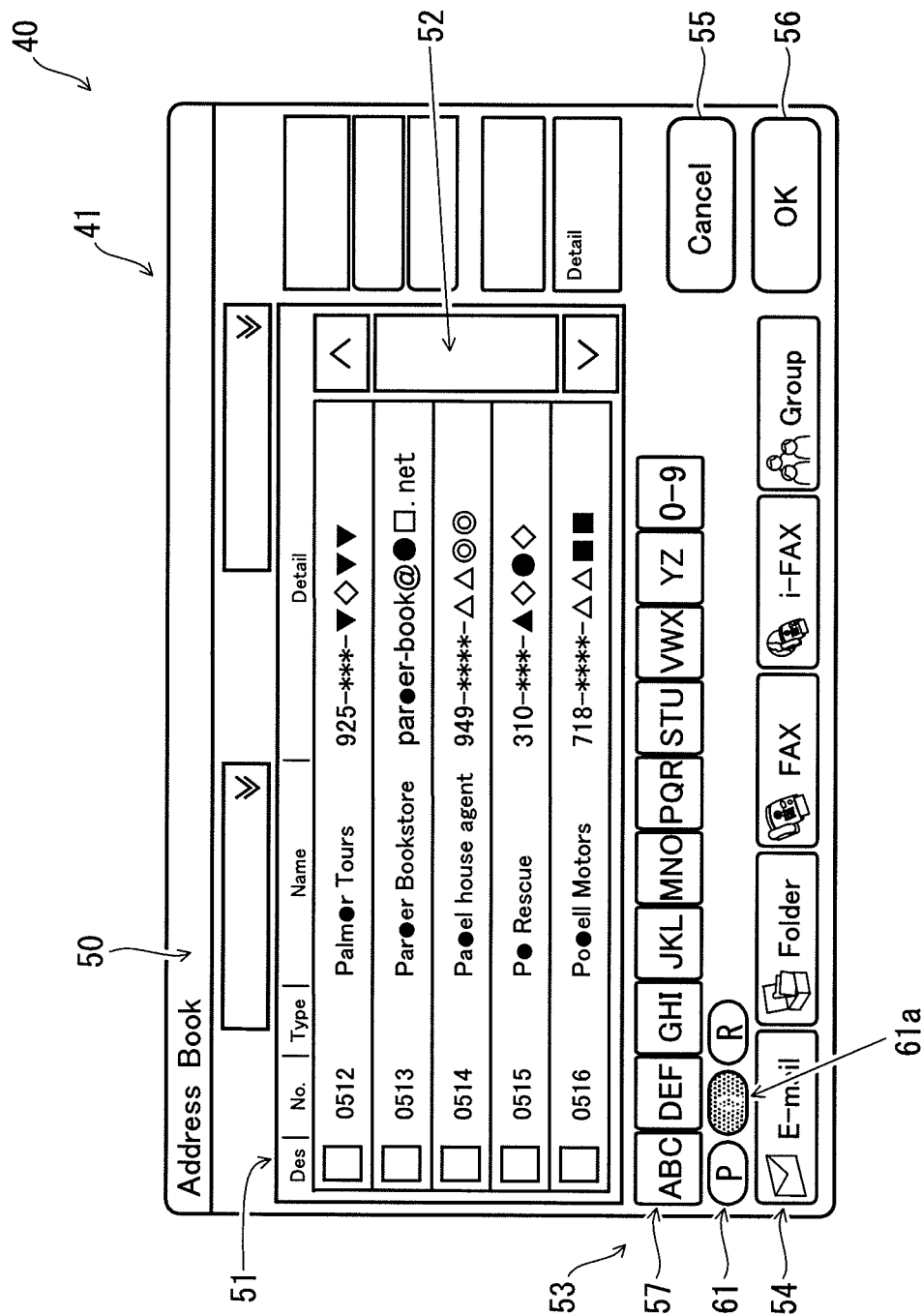
FIG. 10 is an elevational view of a display device according to a second embodiment of the invention, showing a state in which a plurality of first input keys and a plurality of second input keys are arranged.
Figure 11:
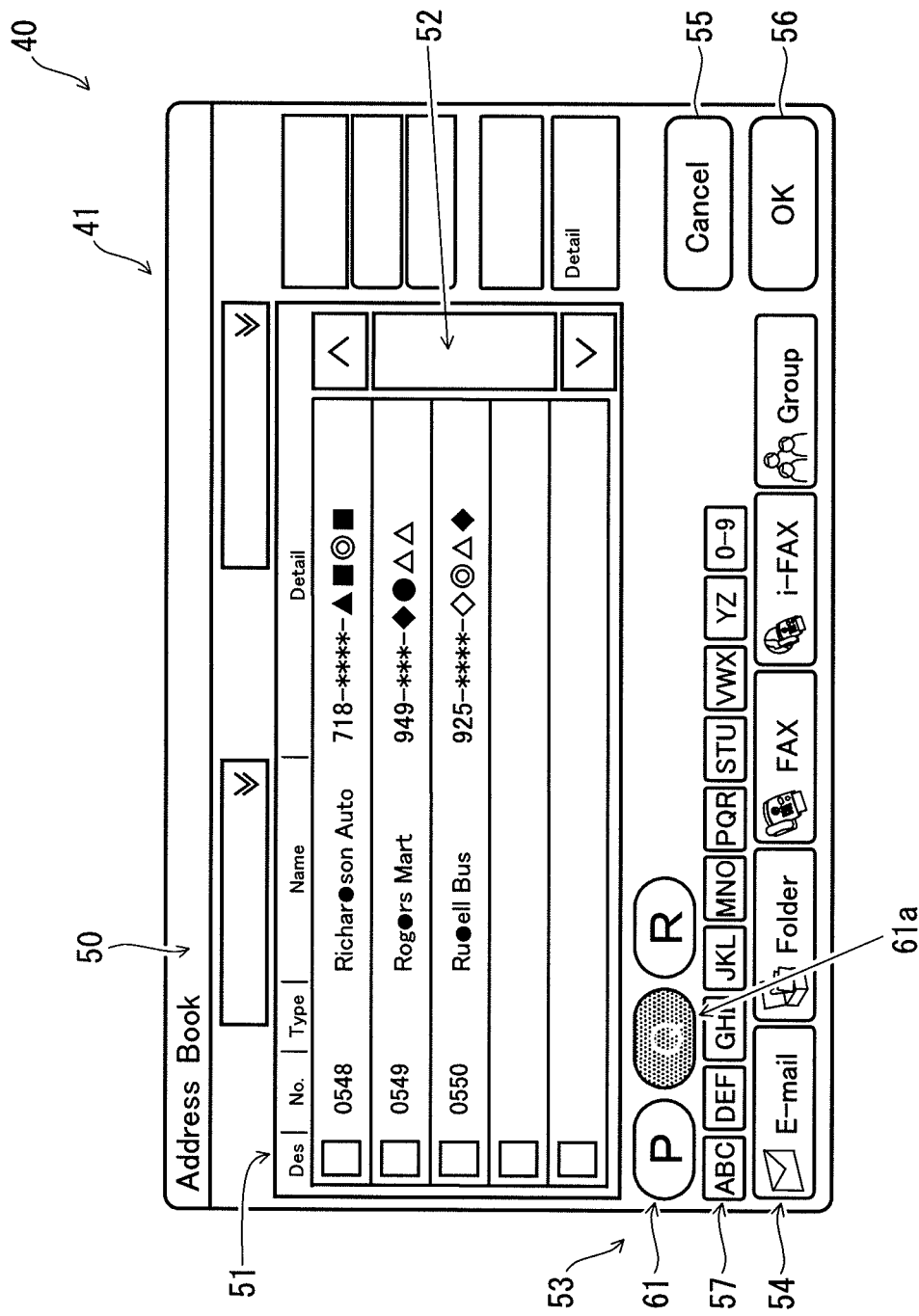
FIG. 11 is an elevational view of the same display device as that of FIG. 10, showing a state in which the plurality of second input keys is arranged on an upper side.
Figure 12:
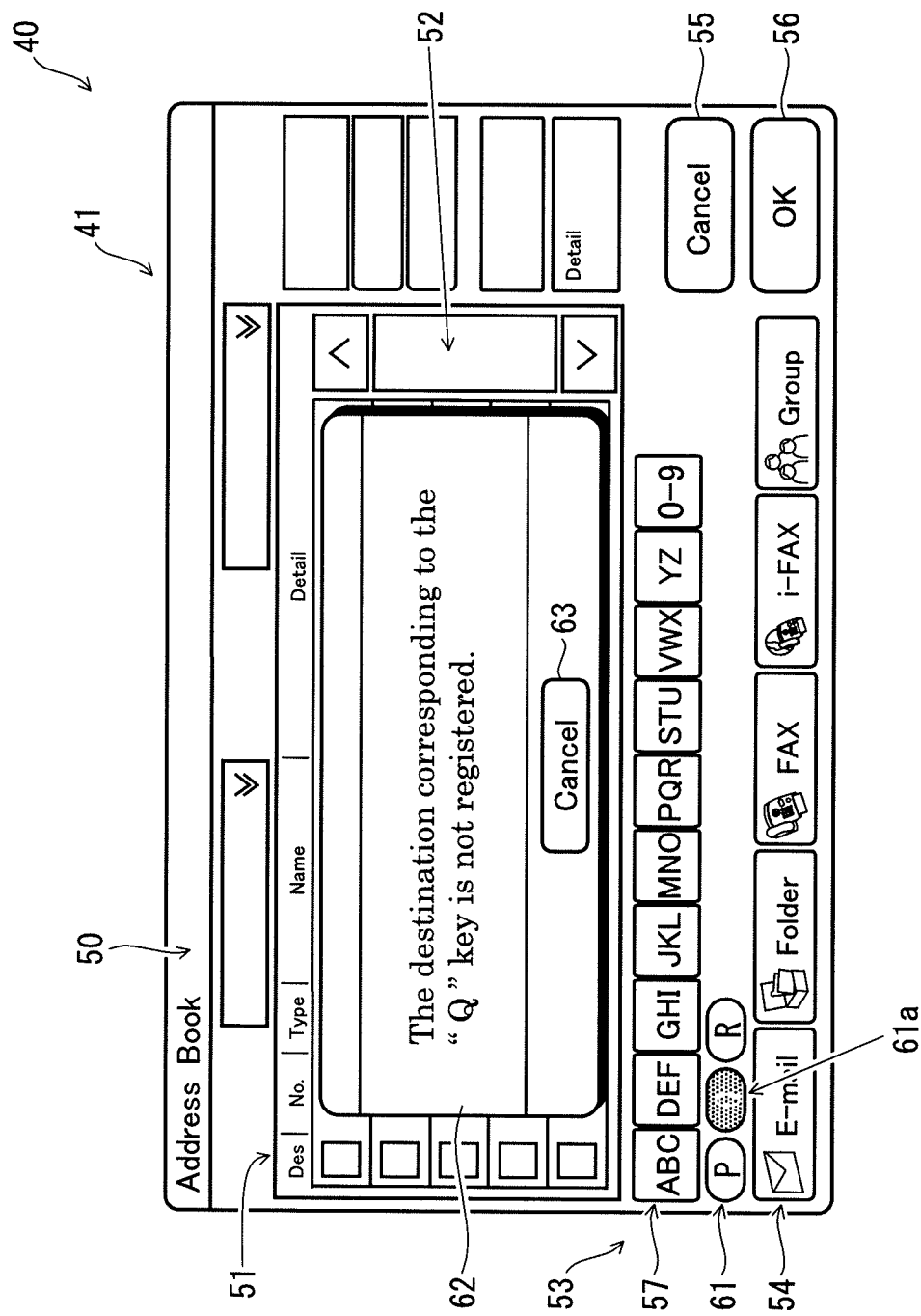
FIG. 12 is an elevational view of the same display device as that of FIG. 10, showing a state in which the input key without any destinations has been selected.
Figure 13:
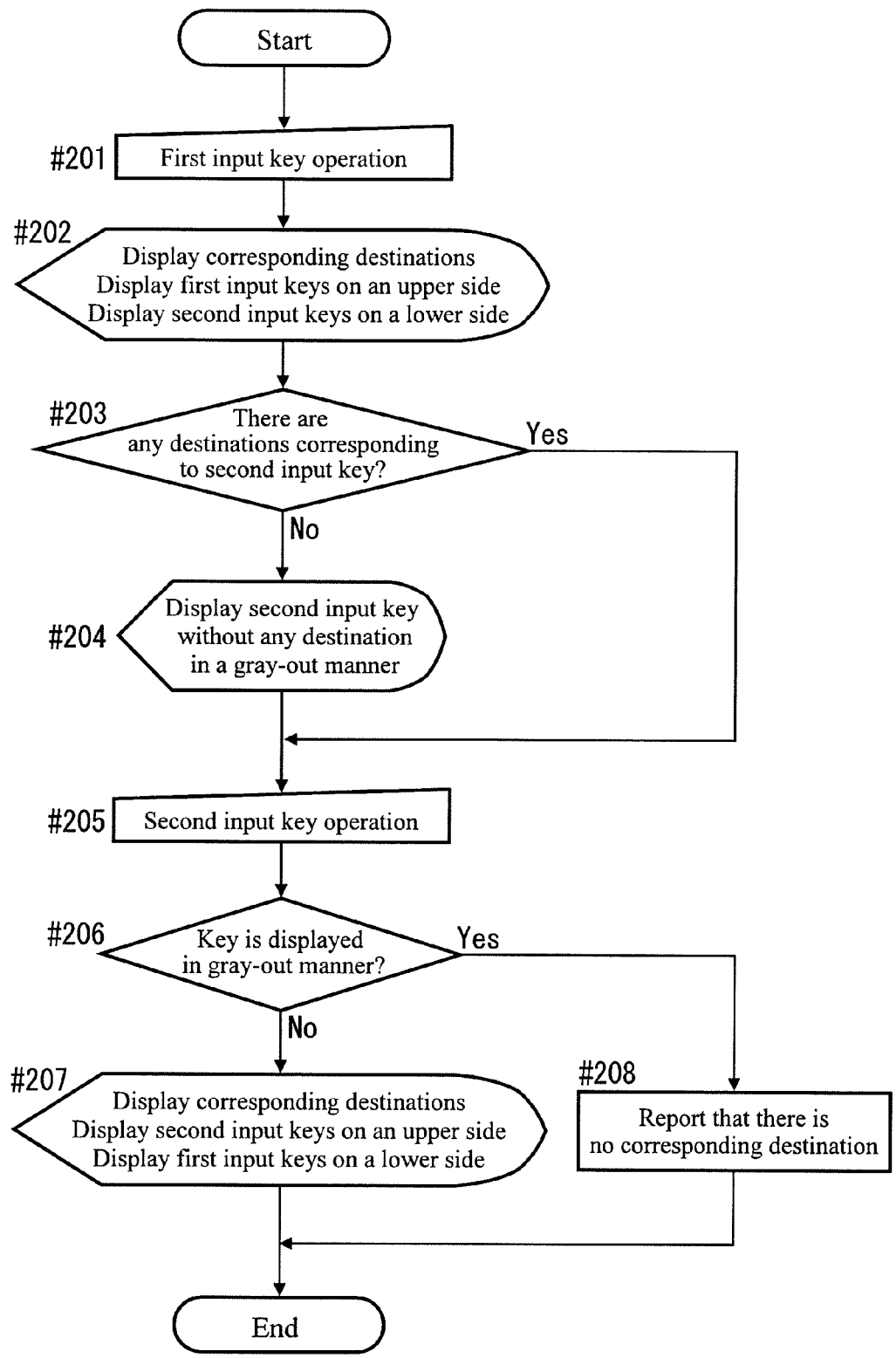
FIG. 13 is a flow chart showing operation related to destination search in the display device according to the second embodiment.

Next, an operation method related to destination search in a display device according to the second embodiment of the invention, will be described with reference to FIGS. 10 to 13 in addition to FIG. 4 and along a flow shown in FIG. 13. FIG. 10 is an elevational view of the display device, showing a state in which a plurality of first input keys and a plurality of second input keys are arranged, FIG. 11 is an elevational view of the same display device as that of FIG. 10, showing a state in which the plurality of second input keys are arranged on an upper side, FIG. 12 is an elevational view of the same display device as that of FIG. 10, showing a state in which the input key without any destinations has been selected, and FIG. 13 is a flow chart showing the operation related to the destination search in the display device. Basic configuration of this embodiment is the same as that of the first embodiment described with reference to FIGS. 1 to 9, and thus components in common with the first embodiment are provided with the same numerals as those used before and their illustration in the figures and description will be omitted.

The description below with reference to these figures is based on the assumption that an initial state is not a state in which destination information to be displayed on a destination list has previously been narrowed down by operating the transmission method selection key 54. Moreover, the description below refers to one example of the operation from when the first input key 57 and the second input key 61 as narrow down keys 53 are operated to narrow down the destination information to when a desired destination is displayed at the destination list display part 51.

When selection of the destination of the image data is needed in the image forming apparatus 1 (Start in FIG. 13), the initial state of the address book screen 50 shown in FIG. 4 is displayed at the operation display part 41 of the display device 40.

Subsequently, upon operation of the first input key 57, for example, the "PQR" key in FIG. 4 by the user (step #201), the display control part 43 changes the address book screen 50 shown in FIG. 4 to that as shown in FIG. 10. Specifically, the display control part 43 displays at the destination list display part 51 pieces of destination information corresponding to the "PQR" of the pressed first input key 57 in order from the top (step #202). Moreover, the display control part 43 displays the operated first input key 57 group immediately below the destination list display part 51 and displays the second input key 61 group "P", "Q", and "R" corresponding to the "PQR" further therebelow.

Then the display control part 43 determines whether or not there are destinations corresponding to all the second input keys 61 for the displayed "PQR" (step #203). The display control part 43 displays the second input keys 61 (for example, the keys "P" and "R" in FIG. 10) with the corresponding destinations, directly at the operation display part 41 in a normal manner without any changes.

On the other hand, the display control part 43 gray-out displays at the operation display part 41 the second input key 61 (for example, a "Q" key 61*a* in FIG. 10) without any corresponding destinations (No in step #203) (step #204). In this manner, the display control part 43 provides different display modes of the second input key 61 group based on the number of destinations corresponding to the second input keys 61 as one of the narrow-down keys 53. Then as a result of the gray-out display of the "Q" key 61*a* of the second input keys 61, the user recognizes at first view that there is no destination corresponding to the "Q" key 61*a*.

Next, upon operation of the second input key 61 by the user (step #205), the display control part 43 determines whether or not this input key is the "Q" key 61*a* gray-out displayed in step #204 (step #206).

If the input key in step #205 is the second input key 61 (for example, the "R") not gray-out displayed (No in step #206), the display control part 43 changes the address book screen 50 shown in FIG. 10 to that as shown in FIG. 11. Specifically, the display control part 43 displays at the destination list display part 51 pieces of destination information corresponding to the "R" of the pressed second input key 61 in order from the top (step #207). Moreover, the display control part 43 displays the second input key 61 group corresponding to the operated "PQR" immediately below the destination list display part 51 and the first input key 57 group further therebelow. Then the display control part 43 turns into a state of standby for destination selection, setting, or other key operation (End in FIG. 13).

Even when the address book screen 50 is changed to that as shown in FIG. 11, the "Q" key 61*a* of the second input key 61 remains gray-out displayed.

On the other hand, if the input key in step #205 is the "Q" key 61*a* gray-out displayed in step #204 (Yes in step #206), the display control part 43 changes the address book screen 50 shown in FIG. 10 to that as shown in FIG. 12. Specifically, the display control part 43 displays at the operation display part 41*a* message box 62 indicating a report that there is no destination corresponding to the "Q" key 61*a* (step #208). This message box 62 can be erased by a cancel key 63. Then the display control part 43 turns into a state of standby for other key operation (End in FIG. 13).

Figure 14:
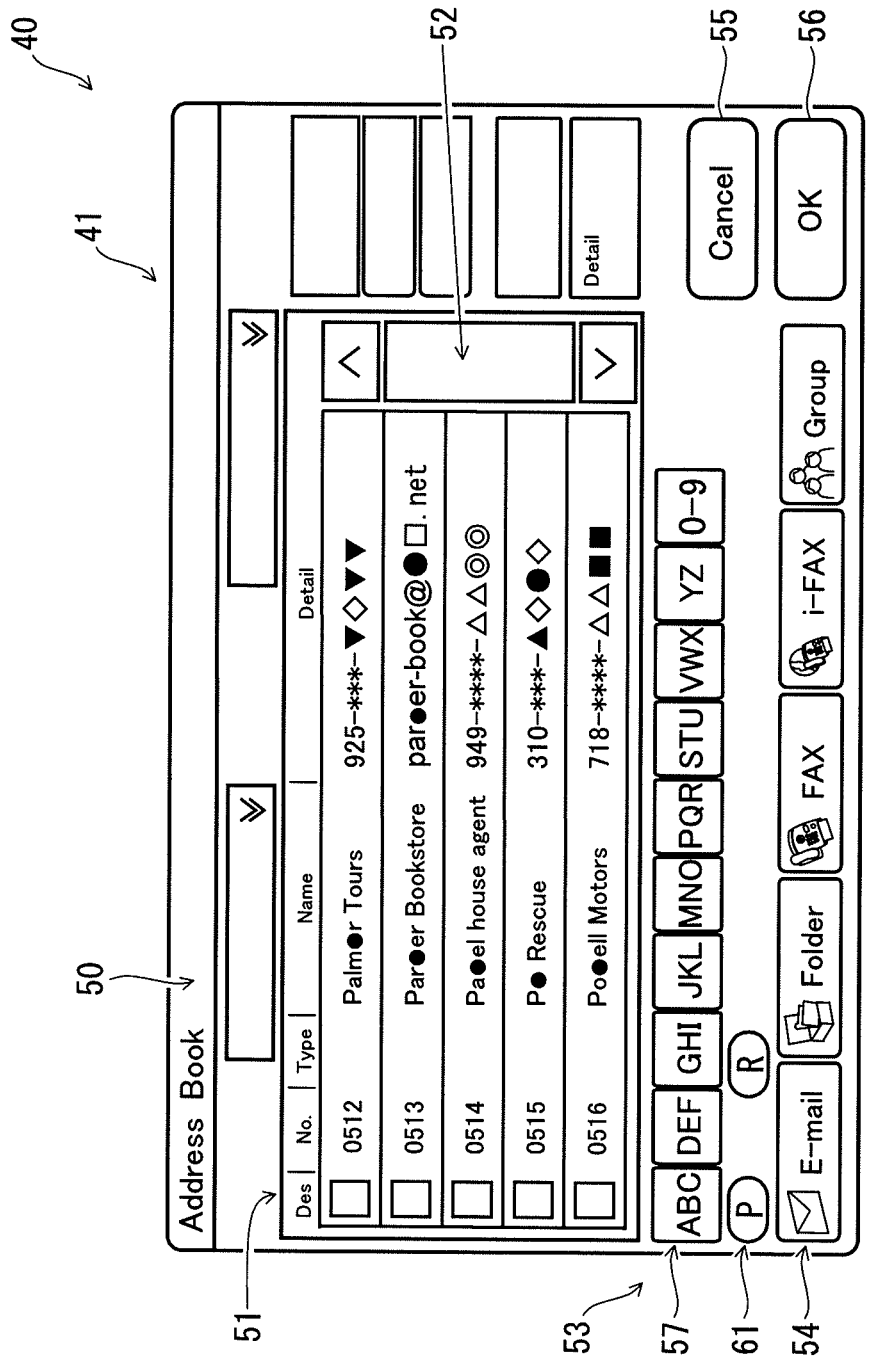
FIG. 14 is an elevational view of a display device according to a third embodiment of the invention.

Next, a display device according to the third embodiment of the invention will be described with reference to FIG. 14. FIG. 14 is an elevational view of the display device. Basic configuration of this embodiment is the same as that of the first and second embodiments described above, and thus components in common with the first and second embodiments are provided with the same numerals as those used before and their illustration in the figure and description will be omitted.

The display control part 43 in the display device 40 according to the third embodiment, in a case where there is no destination corresponding to the second input key 61, does not display this second input key 61, for example, the "Q" key itself at the operation display part 41, as shown in FIG. 14. As a result, the user recognizes at first view that there is no destination corresponds to the "Q" key as the second input key 61 not displayed.

Figure 15:
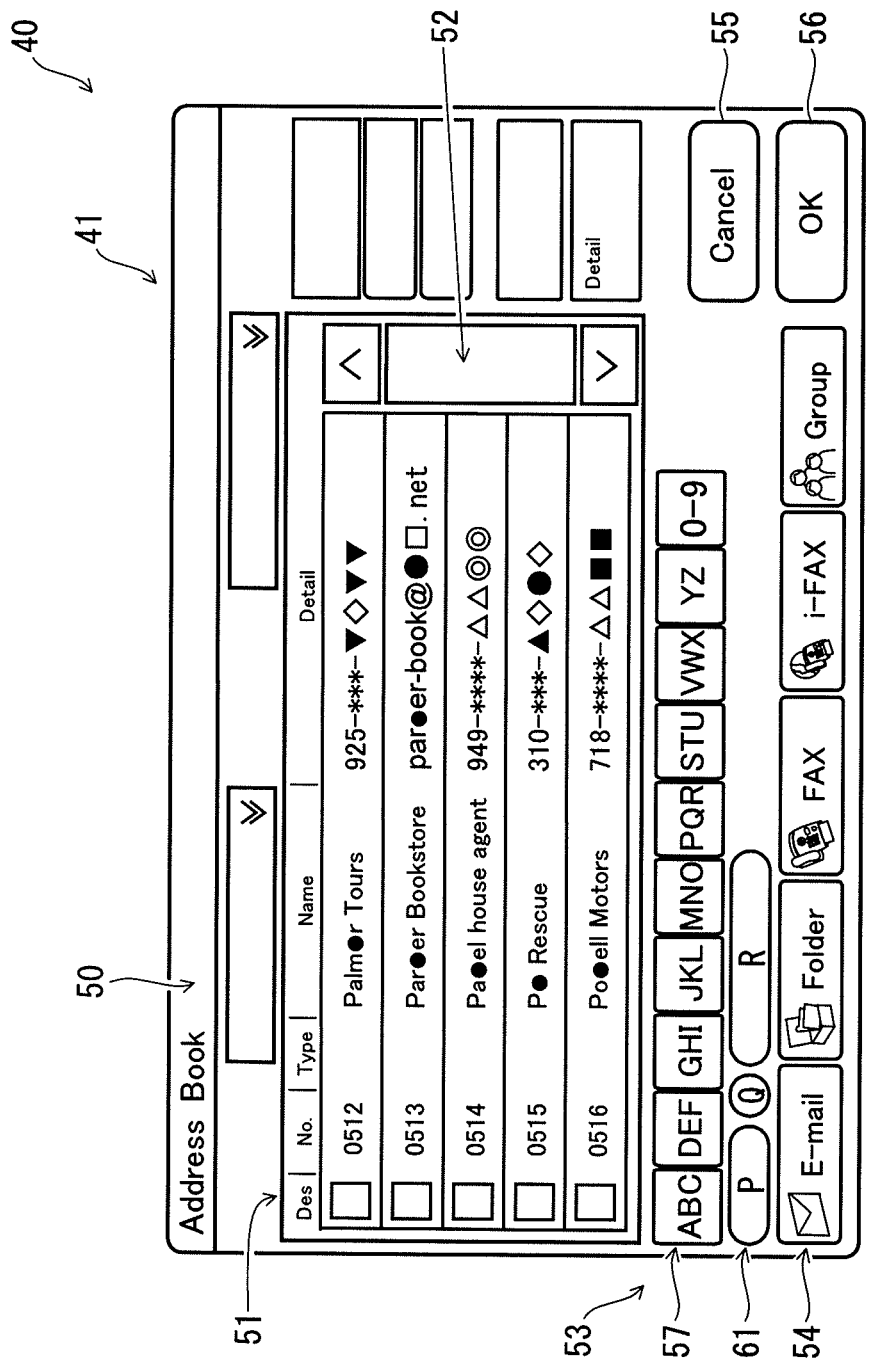
FIG. 15 is an elevational view of a display device according to a fourth embodiment of the invention.

Next, a display device according to the fourth embodiment of the invention will be described with reference to FIG. 15. FIG. 15 is an elevational view of the display device. Basic configuration of this embodiment is the same as that of the first and second embodiments described above, and thus components in common with the first and second embodiments are provided with the same numerals as those used before and their illustration in the figure and description will be omitted.

The display control part 43 in the display device 40 according to the fourth embodiment, based on the numbers of destinations corresponding to the second input keys 61, displays the plurality of second input keys 61 in mutually different sizes at the operation display part 41, as shown in FIG. 15. Specifically, in FIG. 15, the "R" key of the second input keys 61 is displayed in the largest size, while the "Q" key thereof is displayed in the smallest size. Therefore, the user can recognize at first view that the number of destinations is largest for the "R" of the second input keys 61, second largest for the "P", and smallest for the "Q".

For the sizes of the second input keys 61 based on the numbers of corresponding destinations, horizontal lengths of the second input keys 61 are set in accordance with, for example, a range of the number of destinations previously divided in a stepwise fashion. While the second input key 61 with the smallest number of destinations or the second input key 61 without any destinations in the plurality of second input keys 61 has the smallest size, the respective sizes of the second input keys 61 may be sequentially increased based on proportion of destinations. Previously setting a display region of the entire plurality of second input keys 61, the respective sizes of the second input keys 61 may be determined based on the proportions of destinations so that all the second input keys 61 lie within this display region.

Figure 16:
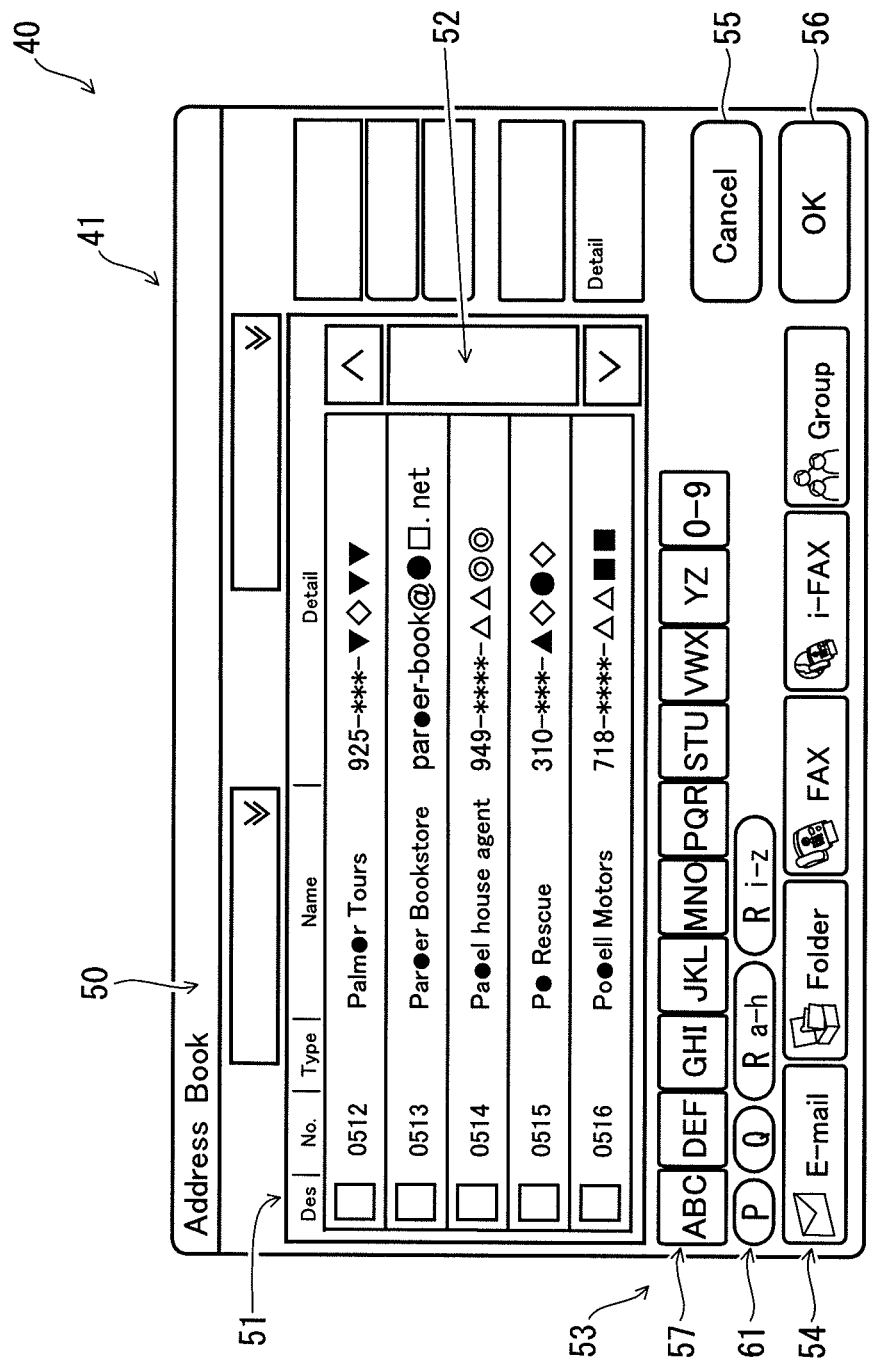
FIG. 16 is an elevational view of a display device according to a fifth embodiment of the invention.

Next, a display device according to the fifth embodiment of the invention will be described with reference to FIG. 16. FIG. 16 is an elevational view of the display device. Basic configuration of this embodiment is the same as that of the first and second embodiments described above, and thus components in common with the first and second embodiments are provided with the same numerals as those used before and their illustration in the figure and description will be omitted.

The display control part 43 in the display device 40 according to the fifth embodiment of the invention, based on the number of destinations corresponding to the second input key 61, divides this second input key 61 and displays it in plural at the operation display part 41, as shown in FIG. 16. Specifically, in FIG. 16, two "R" keys of the second input keys 61 are provided. Then on the left "R" key, the destinations followed by any of letters "a" to "h" in alphabetical order are registered and indicated, and on the right "R" key, the destinations followed by any of letters "i" to "z" in alphabetical order are registered and indicated. Consequently, the numbers of destinations corresponding to the second input keys 61 decrease, which makes the search easier.

For a way of dividing the second input key 61 based on the number of corresponding destinations, for example, if the number of destinations exceeds a predetermined number, the second input key 61 is divided into two so that the number of corresponding destinations becomes equal between the two. The second input key 61 may be divided into two or more every time when the number of corresponding destinations exceeds the predetermined number previously set.

Figure 17:
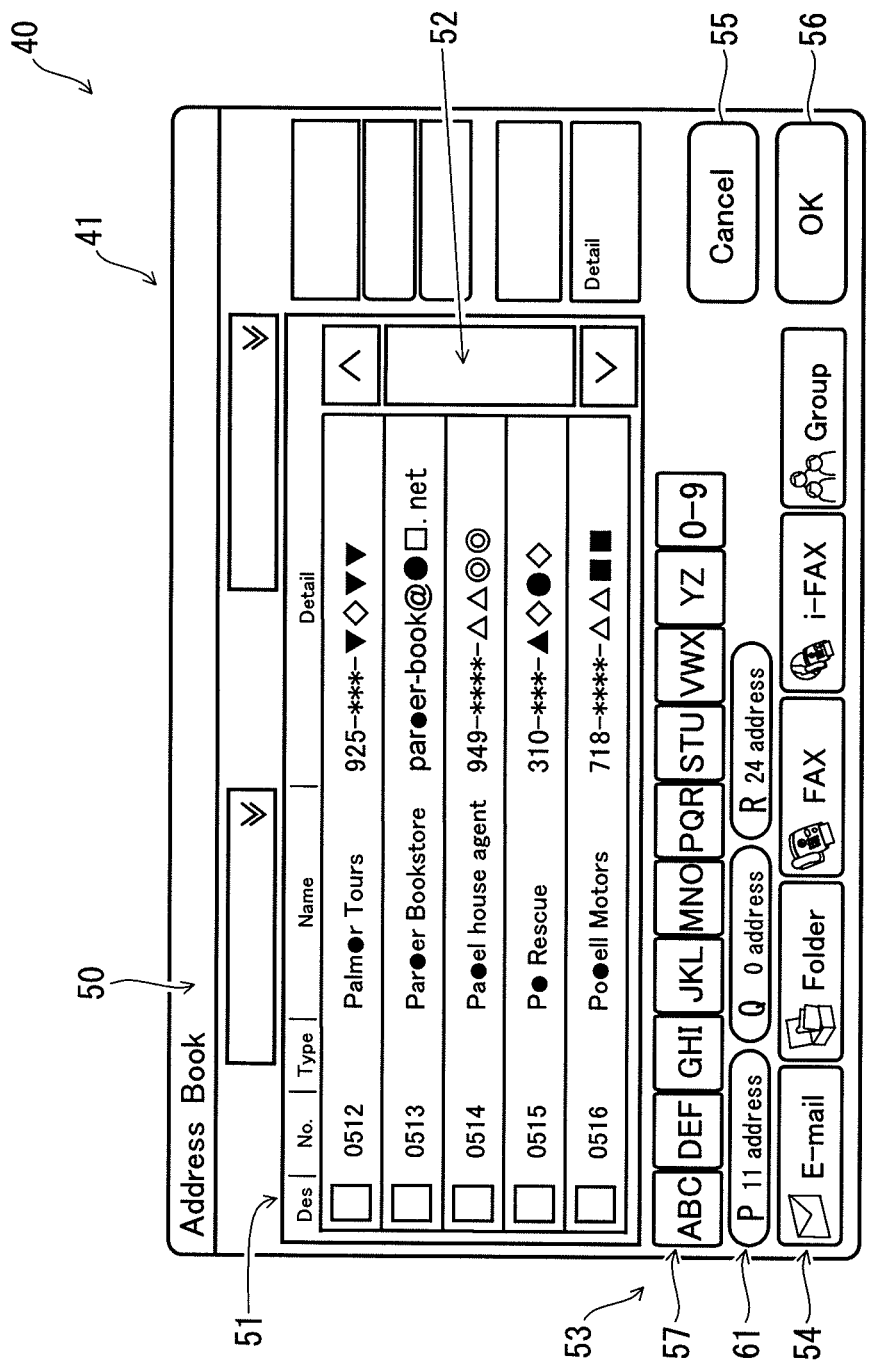
FIG. 17 is an elevational view of a display device according to a sixth embodiment of the invention.

Next, a display device according to the sixth embodiment of the invention will be described with reference to FIG. 17. FIG. 17 is an elevational view of the display device. Basic configuration of this embodiment is the same as that of the first and second embodiments described above, and thus components in common with the first and second embodiments are provided with the same numerals as those used before and their illustration in the figure and description will be omitted.

The display control part 43 in the display device 40 according to the sixth embodiment displays the numbers of destinations corresponding to the second input keys 61 on the respective plurality of second input keys 61, as shown in FIG. 17. Specifically, a state shown in FIG. 17 means that 11 destinations are registered for the "P" key of the second input keys 61, 0 destinations for the "Q" key thereof, and 24 destinations for the "R" key thereof. This clarifies the numbers of destinations corresponding to the second input keys 61.

With the configuration of the second to sixth embodiments of the invention, the plurality of second input keys 61 arrayed for narrowing down the destinations to be displayed on the destination list are displayed in mutually different modes due to a difference in the number of corresponding destinations, which makes it easy to identify each of the plurality of second input keys 61. Consequently, a key operation error can be controlled, which makes it possible to narrow down the destinations without taking unnecessary procedures and thus easily display a desired destination on the destination list. Therefore, the display device 40 with improved operability related to the destination search can be provided. Moreover, the image forming apparatus 1 can be provided which is loaded with such a display device 40 and which has excellent user-friendliness.

Figure 18:
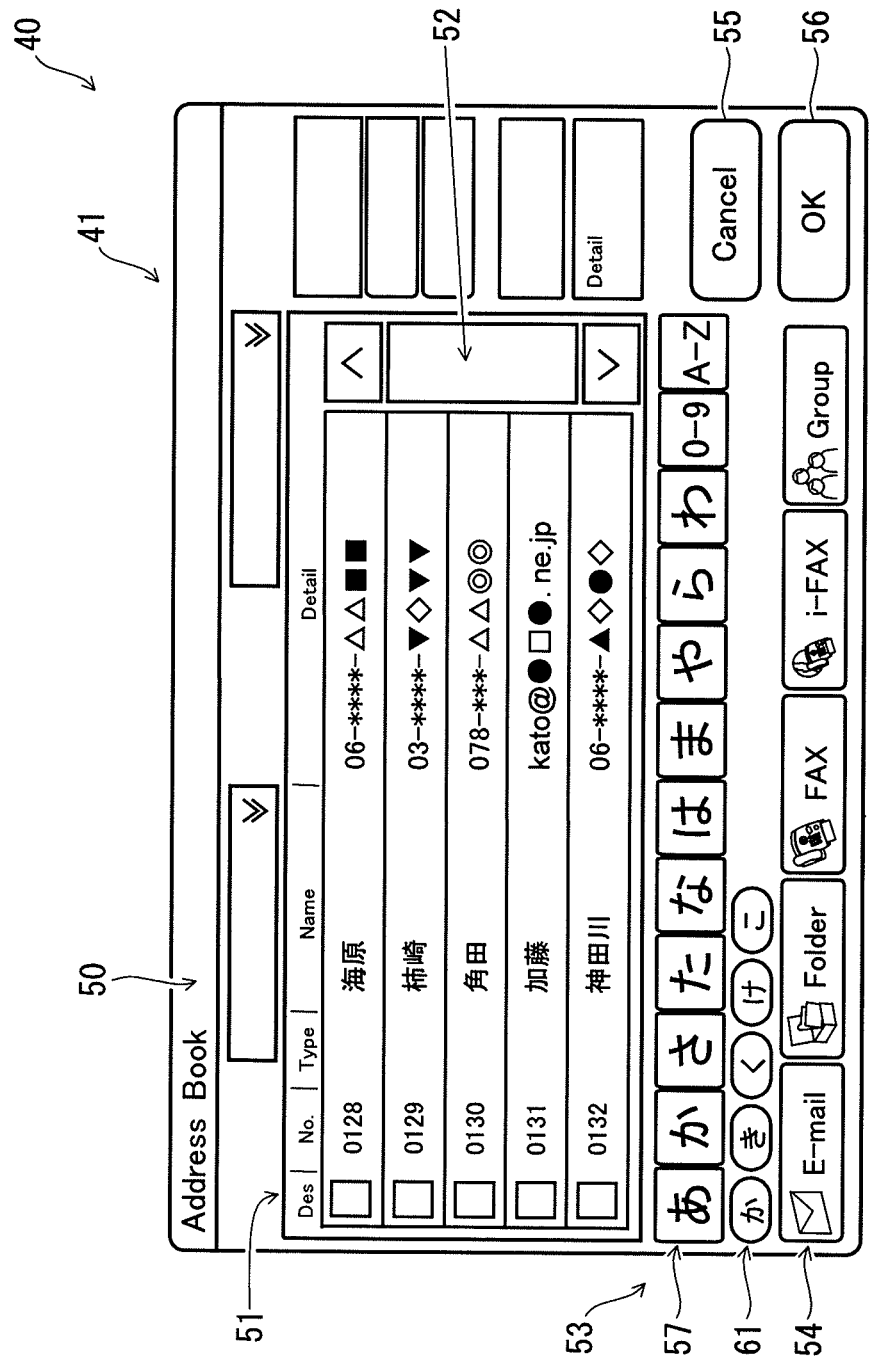
FIG. 18 is an elevational view of a display device according to a seventh embodiment of the invention.

Next, a display device according to the seventh embodiment of the invention will be described with reference to FIG. 18. FIG. 18 is an elevational view of the display device. Basic configuration of this embodiment is the same as that of the first and second embodiments described above, and thus components in common with the first and second embodiments are provided with the same numerals as those used before and their illustration in the figure and description will be omitted.

The display device 40 according to the seventh embodiment is provided in the operation panel 30 of the image forming apparatus 1 targeted on Japanese-using users. As shown in FIG. 18, the address book screen 50 is indicated mostly in Japanese.

At the destination list display part 51 of the address book screen 50, pieces of destination information registered in the address book are displayed in order of Japanese syllabary. The display region of the destination list display part 51 includes five pieces of destination information, and thus displays only the top five pieces.

Narrow-down keys 53 include input key groups such as a plurality of first input keys 57 and a plurality of second input keys 61, as shown in FIG. 18. On the first input keys 57, initial letters of respective rows of the Japanese syllabary are respectively set and indicated. On the second input keys 61, "individual five letters in a row of the Japanese syllabary" corresponding to the pressed first input key 57 are respectively set and indicated.

With the configuration of the seventh embodiment of the invention, as is the case with the configuration of the first to sixth embodiments, the destinations can be narrowed down without taking unnecessary procedures and thus a desired destination can easily be displayed on the destination list. Therefore, the display device 40 with improved operability related to the destination search can be provided. Moreover, the image forming apparatus 1 can be provided which is loaded with such a display device 40 and which has excellent user-friendliness.

Figure 19:
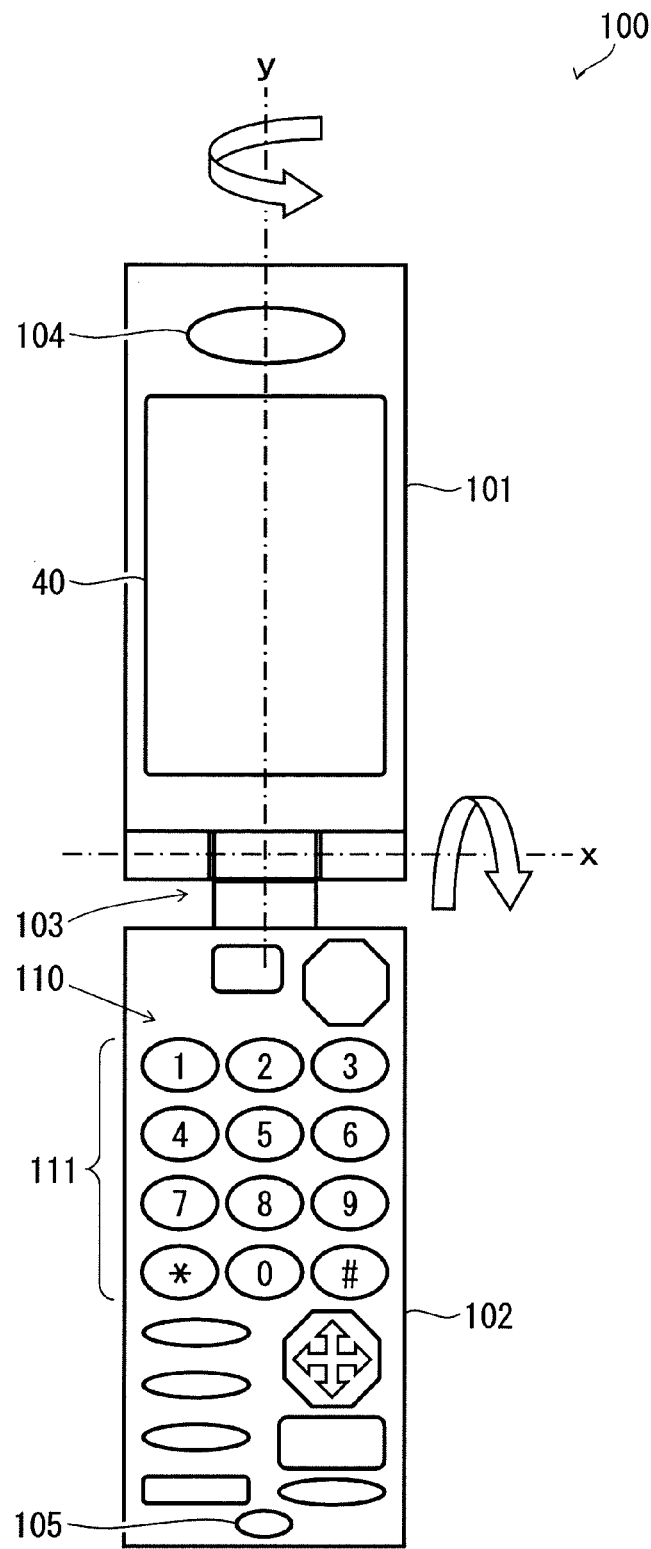
FIG. 19 is an elevational view of an electronic device (cellular phone unit) loaded with a display device according to an eighth embodiment of the invention.
Figure 20:
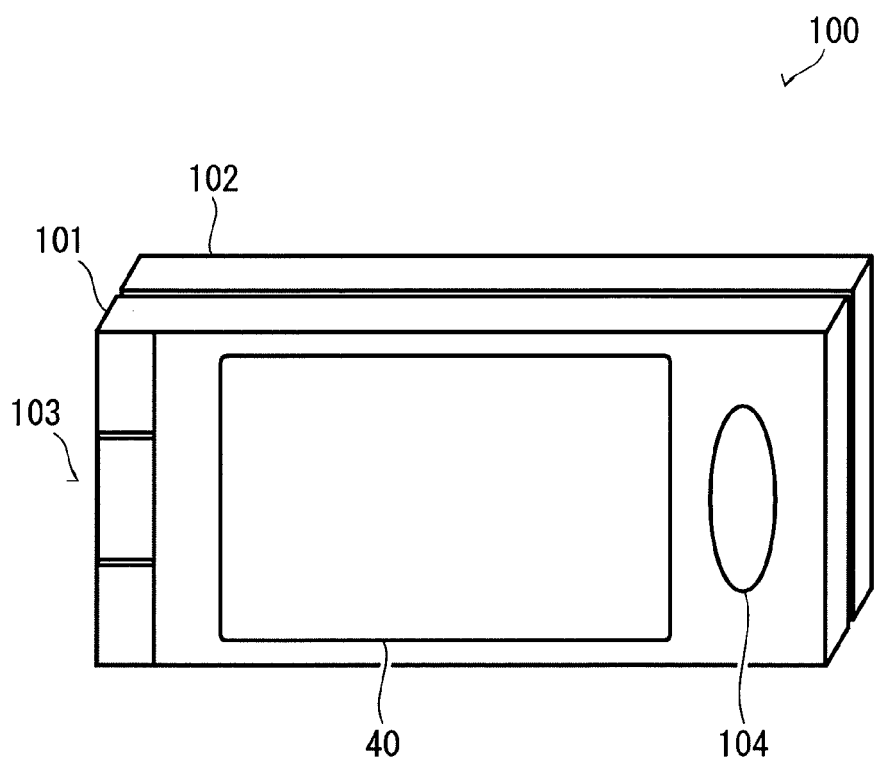
FIG. 20 is a perspective view of the cellular phone unit shown in FIG. 19 in a folded state.
Figure 21:
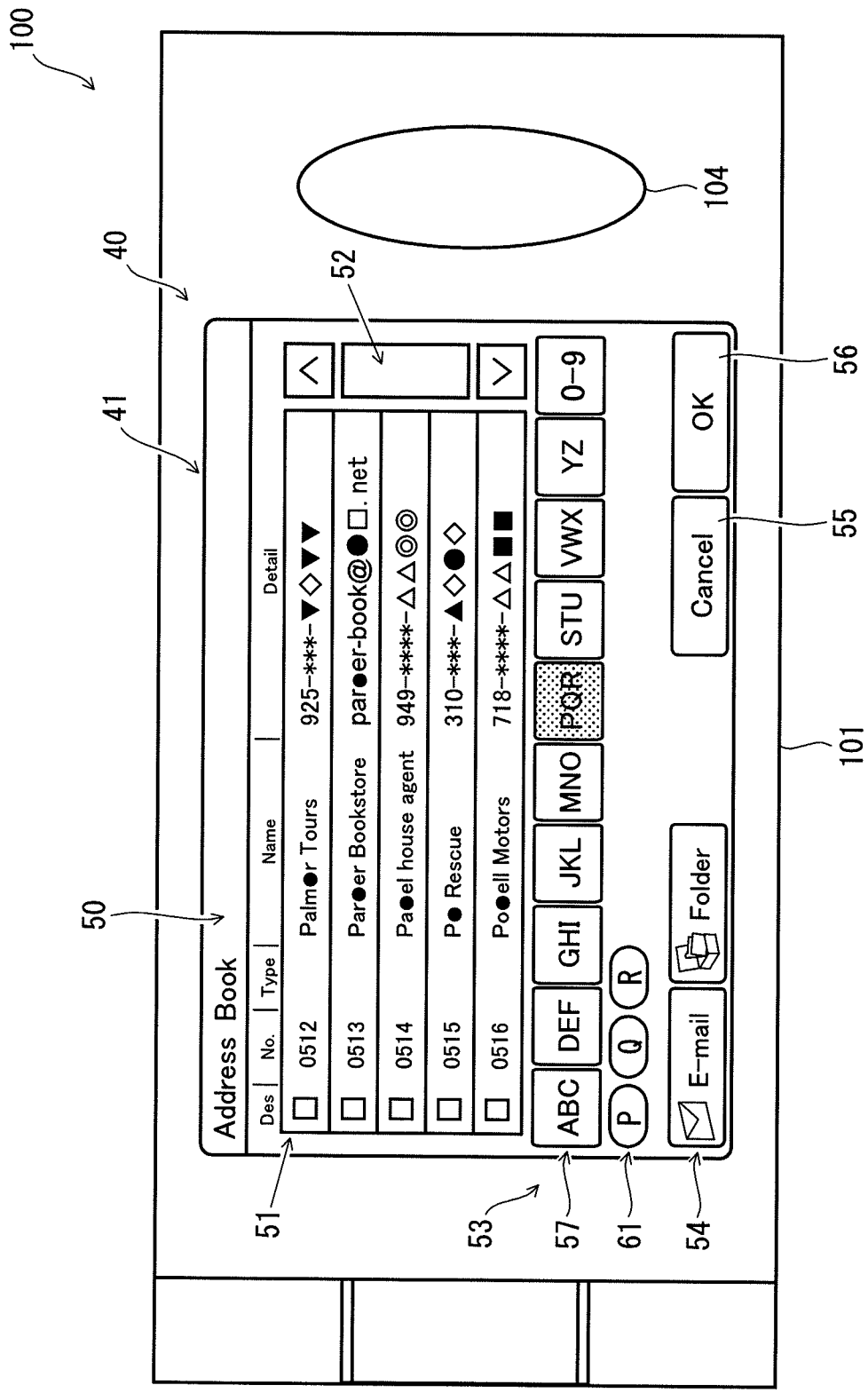
FIG. 21 is an elevational view of the display device of the cellular phone unit shown in FIG. 20.

Next, an electronic device loaded with a display device according to the eighth embodiment of the invention will be described with reference to FIGS. 19 to 21. Here, the description of the electronic device of the invention refers to a cellular phone unit as one example. FIG. 19 is an elevational view of the electronic device (cellular phone unit) loaded with the display device, FIG. 20 is a perspective view of the cellular phone unit in a folded state, and FIG. 21 is an elevational view of the display device of the cellular phone unit. Basic configuration of this embodiment is the same as that of the first and second embodiments described above, and thus components in common with the first and second embodiments are provided with the same numerals as those used before and their illustration in the figures and description will be omitted.

The display device 40 according to the eighth embodiment is loaded in the cellular phone unit 100 as shown in FIG. 19. The cellular phone unit 100 is provided with: in addition to the display device 40, a first casing 101, a second casing 102, a hinge part 103, a receiver part 104, a transmission part 105, and an operation panel 110.

The first casing 101 and the second casing 102 are both formed into a rectangular solid shape and coupled together with the hinge part 103. The hinge part 103 permits x-axis rotation and y-axis rotation (shown in FIG. 19) of the first casing 101 relative to the second casing 102.

The x-axis rotation of the first casing 101 relative to the second casing 102 permits folding with front surfaces of the both casings facing each other. Moreover, the x-axis rotation and then y-axis rotation of the first casing 101 relative to the second casing 102 permits the display device 40 to be viewed on the front surface of the first casing 101 in the folded state as shown in FIG. 20.

The receiver part 104 is provided at an upper part of the first casing 101, and the test transmission part 105 is provided at a lower part of the second casing 102 in FIG. 19. In telephone communication, voice on the other end of line is heard from the receiver part 104 and the user speaks to the other end of line from the transmission part 105.

The operation panel 110 is provided on the front surface of the second casing 102. Arranged on the operation panel 110 are: in addition to a ten key 111, for example, a power key, a call key, a mail key, an address book key, a clear key, a determine key, a cursor key, etc, all not shown.

The display device 40 is provided on the front surface of the first casing 101. The display device 40, as is the case with the first embodiment, is provided with: a liquid crystal display part displaying with liquid crystals items such as input, settings, and instructions; and a touch panel part accepting key input and selection of the item displayed at the liquid crystal display part through user's contact with his/her finger.

The display device 40, for example, by operating the address book key (not shown) of the operation panel 110, can display the address book screen 50 shown in FIG. 21. FIG. 21 illustrates the address book screen 50 displayed on the display device 40 of the cellular phone unit 100 in the folded state shown in FIG. 20.

At the destination list display part 51 of the address book screen 50, pieces of destination information registered in an address book are displayed in alphabetical order from the top. A display region of the destination list display part 51 includes five pieces of destination information, and thus only the top five pieces are displayed.

The narrow-down keys 53 are provided with input key groups such as a plurality of first input keys 57 and a plurality of second input keys 61. On the first input keys 57, 26 alphabetical letters are respectively set and indicated in sets of approximately three letters. Specifically, they start with "ABC", "DEF", ending with the two letters "YZ" only at the end. On the second input keys 61, "single alphabetical letters" corresponding to the pressed first input key 57 are respectively set and indicated. For example, if "PQR" has been pressed from among the plurality of first input keys 57, "P", "Q", and "R" are displayed as the plurality of second input keys 61 immediately below the plurality of first input keys 57 as shown in FIG. 21.

With the configuration according to the eighth embodiment of the invention, even in a case where the display device 40 is loaded in the cellular phone unit 100 as one example of the electronic device, as is the case with the configuration of the other embodiments, the destinations can be narrowed down without taking unnecessary procedures and thus a desired destination can easily be displayed on the destination list. Therefore, the display device 40 with improved operability related to the destination search can be provided. Moreover, the cellular phone unit 100 can be provided which is loaded with such a display device 40 and which has excellent user-friendliness.

The embodiments of the invention have been described above, but the scope of the invention is not limited to them, and thus various modifications can be added within a range not departing from the spirits of the invention.

For example, the embodiments of the invention described above have been described, referring to as an example, the display device 40 loaded in the image forming apparatus 1 or the cellular phone unit 100, but devices to which the invention is applicable are not limited to the image forming apparatus and the cellular phone unit, and thus the display device of the invention may be loaded in devices (for example, PDA), other than the image forming apparatus and the cellular phone unit, that are provided with an address book.

The image forming apparatus 1 loaded with the display device 40 is an image forming apparatus for black-and-white printing using only a black toner, but an image forming apparatus to which the invention is applicable is not limited to such a type, and thus it may be a tandem type or rotary-lack type image forming apparatus for color printing which is provided with an intermediate transfer belt and which is capable of image formation with a plurality of colors superimposed on each other.

In the second and third embodiments, the second input key 61 without any corresponding destinations is gray-out displayed or the second input key 61 itself without any corresponding destinations is not displayed. Alternatively, in a case where there is no destination corresponding to the first input key 57, this first input key 57 may be gray-out displayed or the first input key 57 itself may not be displayed.

Furthermore, the first to sixth embodiments providing the alphabet indication can be combined together for application.

The cellular phone unit 100 loaded with the display device 40 is provided with the first casing 101 and the second casing 102 which can be folded, but a cellular phone unit to which the invention is applicable is not limited to such a type, and thus the invention is also applicable to a cellular phone unit with a slidable first casing 101 and a slidable second casing 102 and a cellular phone unit formed of only one casing without such a deformation mechanism.

What is claimed is:

1. A display device comprising:
an operation display part having a touch panel part and a screen, the operation display part displaying on the screen a plurality of input keys and accepting key operation on the input keys, the operation display part further displaying a list in which a plurality of items of destination information are arrayed;
a key operation detection part detecting operation on the input keys; and
a control part specifying an operated input key among the input keys based on information from the key operation detection part, and causing display at the operation display part of a plurality of first input keys which are arranged for narrowing down the destination information displayed on the list and which are assigned and indicated with 26 alphabetical letters in groups of plural alphabetical letters respectively and a plurality of second input keys which, when one of the plurality of first input keys is pressed, are each assigned and indicated with one alphabetical letter that is the same as one of the plural alphabetical letters indicated on the pressed first input key, the control part dividing a second input key, when a number of destinations corresponding to the one alphabetical letter assigned to that second input key exceeds a previously set predetermined number, into two divided second input keys such that equal numbers of destinations correspond thereto respectively, or dividing a second input key, every time a number of destinations corresponding thereto exceeds a previously set predetermined number, into two or more divided second input keys and indicating each of the divided second input keys with, along with the one alphabetical letter, a range of alphabetical letters that can follow the one alphabetical letter, wherein when a number of destinations corresponding to one alphabetical letter assigned to a second input key does not exceed the previously set predetermined number, the control part does not divide the second input key but indicates the second input key with the one alphabetical letter.

2. An image forming apparatus including the display device according to claim 1.

3. An electronic device including the display device according to claim 1.

4. A display device comprising:

an operation display part having a touch panel part and a screen, the operation display part displaying on the screen a plurality of input keys and accepting key operation on the input keys, the operation display part further displaying a list of destinations;

a key operation detection part detecting operation on the input keys; and a control part responsive to an indication of input key operation from the key operation detection part to cause display at the operation display part of a plurality of first keys and a plurality of second keys for narrowing down the destinations displayed in the list, the control part causing display of first keys with characters representing alphabetical characters A through Z, the characters being displayed in groups of n characters on each first key the control part causing display of selected second keys after one of the first keys has been operated, each selected second key being displayed with one character from among the group of n characters of the operated first key whereby n second keys are displayed corresponding to the operated first key, and whereby each second key is associated with a number of destinations in the list, the control part (a) dividing one of the n second keys to cause display of divided second keys when the number of destinations associated with the said one second key exceeds a predetermined number whereby the divided second keys will have about equal numbers of destinations corresponding thereto, and (b) continuing to cause display of the n second keys without division of any second key when no second key is associated with a number of destinations exceeding the predetermined number, each divided second key being displayed with the same one character as displayed on the second input key before division and also with a range of characters representing the alphabetical characters such that the combined ranges of the divided keys include all of the characters displayed by the first keys.

5. An image forming apparatus including the display device according to claim 4.

6. An electronic device including the display device according to claim 4.

* * * * *